United States Patent
DeWeert et al.

(10) Patent No.: US 9,445,115 B2
(45) Date of Patent: Sep. 13, 2016

(54) CODED IMAGE SYSTEM AND METHOD THEREOF

(71) Applicant: BAE SYSTEMS INFORMATION AND ELECTRONIC SYSTEMS INTEGRATION INC., Nashua, NH (US)

(72) Inventors: Michael J. DeWeert, Kailua, HI (US); Brian P. Farm, South Portland, ME (US); Miles Topping, Honolulu, HI (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 14/547,485

(22) Filed: Nov. 19, 2014

(65) Prior Publication Data

US 2015/0139560 A1 May 21, 2015

Related U.S. Application Data

(60) Provisional application No. 61/906,958, filed on Nov. 21, 2013.

(51) Int. Cl.
*H04N 19/44* (2014.01)
*H04N 19/42* (2014.01)

(52) U.S. Cl.
CPC ............. *H04N 19/44* (2014.11); *H04N 19/42* (2014.11)

(58) Field of Classification Search
CPC ...... G03B 42/02; H04N 19/44; H04N 19/42; H04N 5/335; H04N 5/378; H04N 9/045
See application file for complete search history.

(56) References Cited

U.S. PATENT DOCUMENTS

| 4,190,861 | A | * | 2/1980 | Lux | H04N 19/619 375/240.24 |
|---|---|---|---|---|---|
| 5,946,038 | A | * | 8/1999 | Kalker | H03H 17/0266 375/240.1 |
| 6,064,689 | A | * | 5/2000 | Vollmer | H04B 1/71052 375/149 |
| 6,292,592 | B1 | * | 9/2001 | Braunreiter | G01S 3/7864 342/90 |
| 7,466,575 | B2 | * | 12/2008 | Shalvi | G11C 11/56 365/185.03 |
| 2009/0290806 | A1 | * | 11/2009 | Lelescu | G06T 5/10 382/254 |
| 2009/0297058 | A1 | * | 12/2009 | Hoctor | G03B 42/02 382/274 |
| 2011/0170144 | A1 | * | 7/2011 | Sankarasubramaniam | G06K 9/2063 358/3.28 |
| 2013/0083312 | A1 | * | 4/2013 | Baraniuk | G01J 3/2823 356/51 |

(Continued)

OTHER PUBLICATIONS

Kimura et al. A Hybrid Approach to High Resolution Two Dimensional Spectrum Analysis, IEEE Transantions on Acoustics, Speech, and Signal Processing, vol. Assp-35, No. 7, Jul. 1987.*

(Continued)

*Primary Examiner* — Jingge Wu
(74) *Attorney, Agent, or Firm* — Sand & Sebolt, LPA; Daniel J. Long

(57) ABSTRACT

A coded image system enables a user to recover an object scene from an encoded image. The coded the image system comprises: a physical object scene; an encoding logic creating an encoded image, the encoding logic including a programmable aperture mask spaced a distance away from the physical object scene to encode the encoded image via a doubly-Toeplitz matrix, the doubly-Toeplitz matrix including two one-dimensional vectors; and a decoding logic operatively coupled to the programmable aperture mask to decode the encoded image recovering a visual representation of the object scene from the encoded image.

24 Claims, 24 Drawing Sheets

(56) References Cited

U.S. PATENT DOCUMENTS

| | | | | |
|---|---|---|---|---|
| 2013/0194481 | A1* | 8/2013 | Golub | H04N 9/045 348/336 |
| 2014/0118398 | A1* | 5/2014 | Hall | H04N 19/167 345/633 |
| 2015/0073263 | A1* | 3/2015 | Gdaniec | G01R 33/4818 600/413 |

OTHER PUBLICATIONS

Kimitei, Symon, Algorithms for Toeplitz Matrices and Their Applications to Image Reconstruction. http://www.slideserve.com/vern/by-symon-kimitei-spring-2005. Spring, 2005. 29 pages.

Elfving, Tommy and Touraj Nikazad, Stopping Rules for Landweber-Type Iteration, 2007, Inverse Problems 23, published Jun. 13, 2007, IOP Publishing Ltd. pp. 1417-1432.

Gottesman, Stephan R., and E. E. Fenimore. "New Family of Binary Arrays for Coded Aperture Imaging." Applied Optics, vol. 28, No. 20, Oct. 15, 1989. pp. 4344-4352.

Hadamard, Jacques, "Sur Les Problemes Aux Derivees Partielles Et Leur Signification Physique", Princeton University Bulletin, vol. 13, No. 4, Apr. 1902. pp. 49-52. http://babel.hathitrust.org/cgi/pt?id=chi.095582186; view=1up;seq=65.

Egger, H. "On the Convergence of Modified Landweber Iteration for Nonlinear Inverse Problems." Apr. 14, 2010. pp. 1-16. http://www.aices.rwth-aachen.de:8080/aices/preprint/documentsold/AICES-2010-9.pdf.

Vetterling, William T., Saul A. Teukolsky, and William H. Press. Numerical Recipes in C: The Art of Scientific Computing, Section 2.5, Iterative Improvement of a Solution to Linear Equations, Press Syndicate of the University of Cambridge, 1992, pp. 55-58.

Raskar, Ramesh, Amit Agrawal, and Jack Tumblin. "Coded Exposure Photography: Motion Deblurring Using Fluttered Shutter." TR2006-124, Jul. 2006, pp. 795-804.

Agrawal, Amit, and Ramesh Raskar. "Resolving Objects At Higher Resolution From a Single Motion-Blurred Image." TR2007-036, Jul. 2007, pp. 1-8.

Vetterling, William T., Saul A. Teukolsky, and William H. Press. Numerical Recipes in C: The Art of Scientific Computing, Section 2.11, Is Matrix Inversion an N3 Process? Press Syndicate of the University of Cambridge, 1992, pp. 102-104.

Vetterling, William T., Saul A. Teukolsky, and William H. Press. Numerical Recipes in C: The Art of Scientific Computing, Section 18.4, Inverse Problems and the Use of a Priori Information. Press Syndicate of the University of Cambridge, 1992, pp. 804-808.

Fenimore, E. E., and T. M. Cannon. "Coded Aperture Imaging With Uniformly Redundant Arrays." Applied Optics, vol. 17, No. 3, Feb. 1, 1978, pp. 337-347.

Hansen, Christian. "Deconvolution and Regularization With Toeplitz Matrices." Numerical Algorithms 29 (2002), pp. 323-378.

* cited by examiner

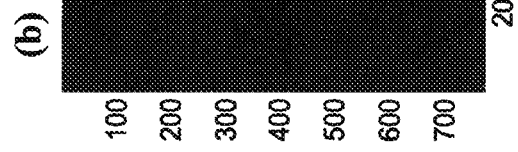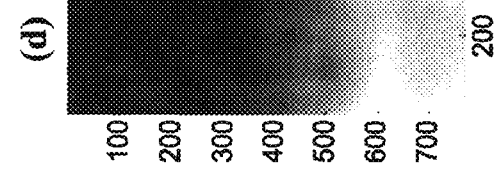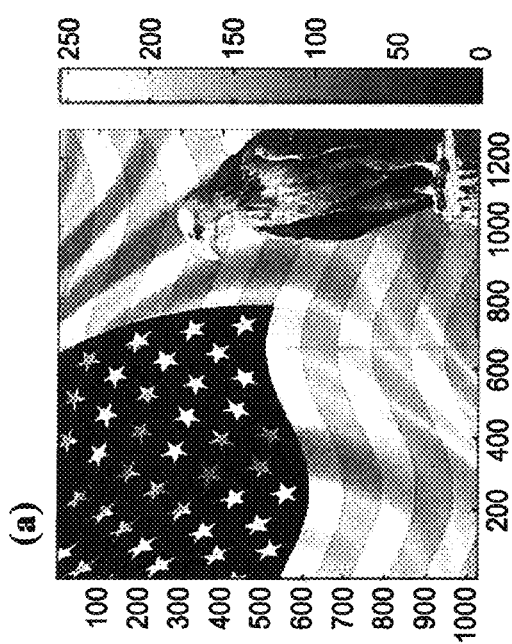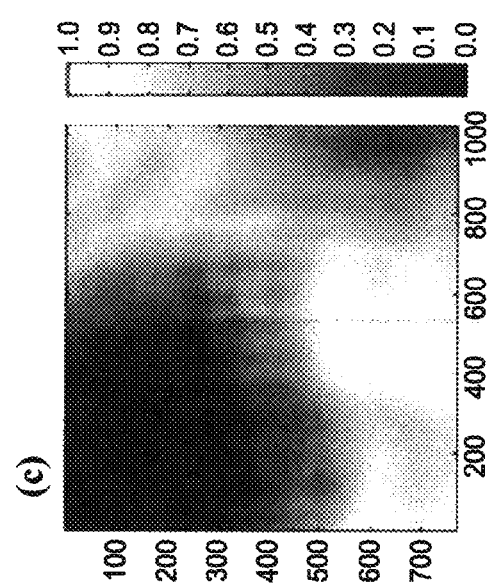
FIG-3A (a) "01"
(b) "02"
(c) "04"
(d) "08"

(a)
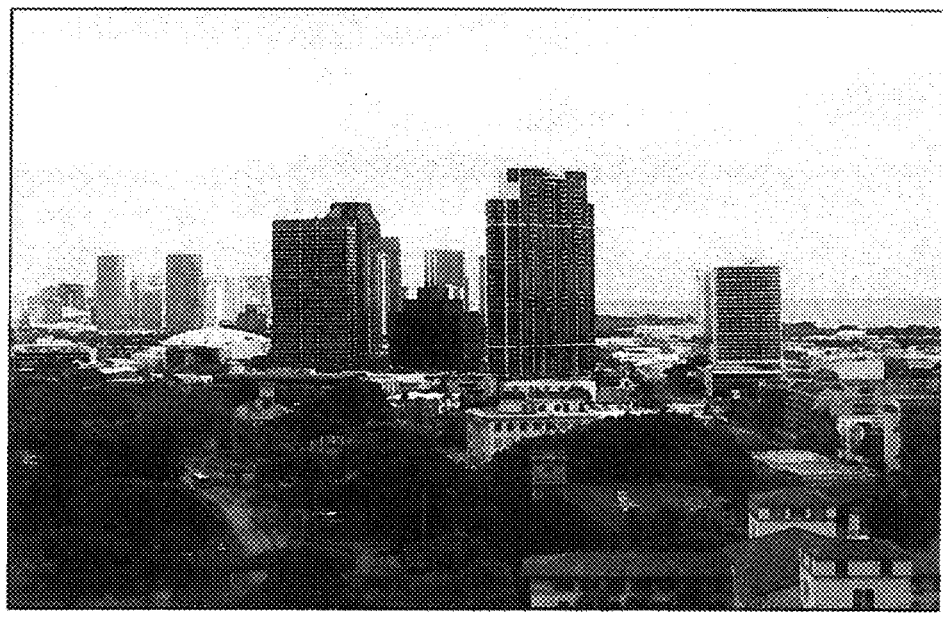
(b)
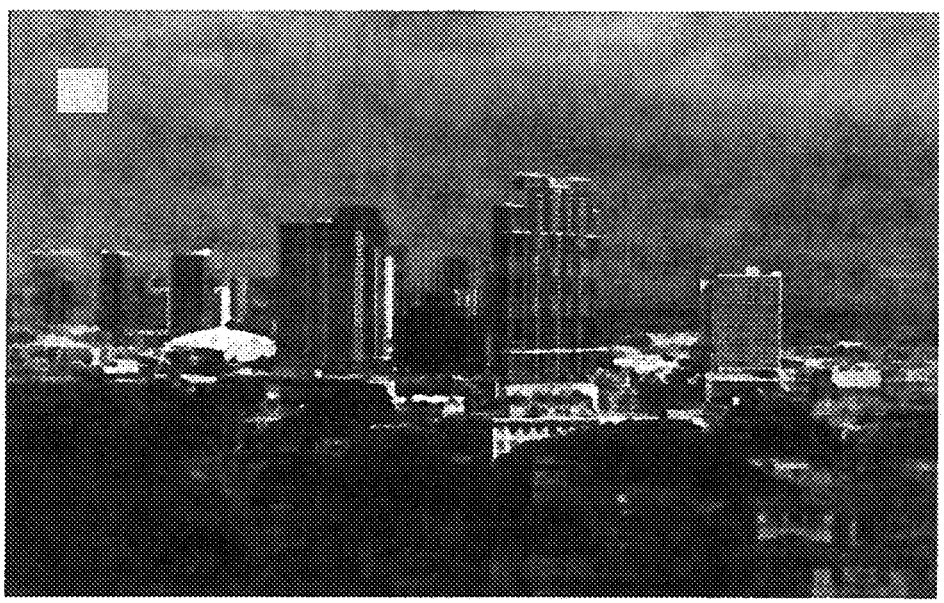
FIG-15

CODED IMAGE SYSTEM AND METHOD THEREOF

CROSS-REFERENCE TO RELATED APPLICATION

This application claims priority from U.S. Provisional Application Ser. No. 61/906,958, filed Nov. 21, 2013, the disclosure of which is incorporated herein by reference.

STATEMENT OF GOVERNMENT INTEREST

This invention was made with US Government assistance under Contract No. N00014-10-C-0193 awarded by the Office of Naval Research (ONR). The US Government has certain rights in this invention.

BACKGROUND OF THE INVENTION

1. Field of the Invention

The present invention relates generally to devices, methods, and systems of coded images. More particularly, an aspect of the present invention relates to lensless imaging and to spatially coded imaging.

2. Brief Description of Prior Developments

Fixed (non-programmable) coded-aperture technology and programmable masks realized with Spatial Light Modulators were heretofore known in the art. The SLM elements are controlled so that the modulated transmission forms an aperture mask, encoding the image with a programmable function. The goal of decoding is to use knowledge of the aperture mask programmed with the programmable function to recover the object scene from the encoded image.

Information-theoretic analyses had identified two such classes of programmable masks used in association with recovering an object scene from an encoded image. The two classes are Uniformly Redundant Arrays (URAs) and Modified URAs (MURAs). Each may be used during the decoding process, however each has some drawbacks. A need therefore exists for an improved method for spatial decoding.

SUMMARY OF INVENTION

In accordance with one aspect of the present invention, an embodiment may provide a coded image system recovering an object scene from an encoded image, the image system comprising: (a) a physical object scene; (b) an encoding logic creating an encoded image, the encoding logic including a programmable aperture mask spaced a distance away from the physical object scene to encode the encoded image via a doubly-Toeplitz matrix, the doubly-Toeplitz matrix including two one-dimensional vectors; and (c) a decoding logic to decode the encoded image recovering a visual representation of the object scene from the encoded image.

In accordance with another aspect of the present invention, one embodiment may provide: a method comprising the steps of: encoding an image through an aperture mask programmed with a doubly-Toeplitz matrix coupled to a camera to create an encoded image; decoding the encoded image to recover a visual representation of an object scene; and displaying the recovered object scene in a monitor, wherein the recovered object scene is larger than the encoded image. The step of decoding may be accomplished within a computational time period to decode in less than one second for images that are one hundred megapixels in size. The step of decoding may also include the steps of: filtering the doubly-Toeplitz encoded image to remove pixel-to-pixel response variations caused by one or more of the following: dark noise, fixed-pattern noise, and bad pixels; regularizing the decoding of the doubly-Toeplitz encoded image via a Tikhonov or similar regularization method; and reconstructing the object scene as a decoded image larger than the encoded image. The step of decoding may also include the step of iterating the encoded image to reduce numerical round-off errors in inversions of the doubly-Toeplitz matrix in the aperture mask.

In accordance with another aspect of an embodiment of the present invention a doubly-Toeplitz mask is an example of an optical system in which the operation of the optics create an image that can be modeled separately in the two axes of an imager, so that the two-dimensional OTF (optical transfer function) can be treated as a sequential (x-axis then y-axis, or y-axis then x-axis) application of two one-dimensional OTFs. Separable optics have the advantage of having blur functions that can be processed very quickly to improve the quality of the images. The mathematical methods outlined herein are applicable to any system having separable OTFs, and would improve the quality of images recovered from such systems.

BRIEF DESCRIPTION OF THE DRAWINGS

A sample embodiment of the invention is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale. The present invention is further described with reference to the accompanying drawings wherein:

FIG. 3A depicts features of Tikhonov-regularized decoding of simulated doubly-Toeplitz-mask encoded images, wherein panel (a) is the object scene, panel (b) is the Toeplitz mask, panel (c) is a partial mask encoding shown with noise, and panel (d) is a partial mask shown without noise

Figure 6:
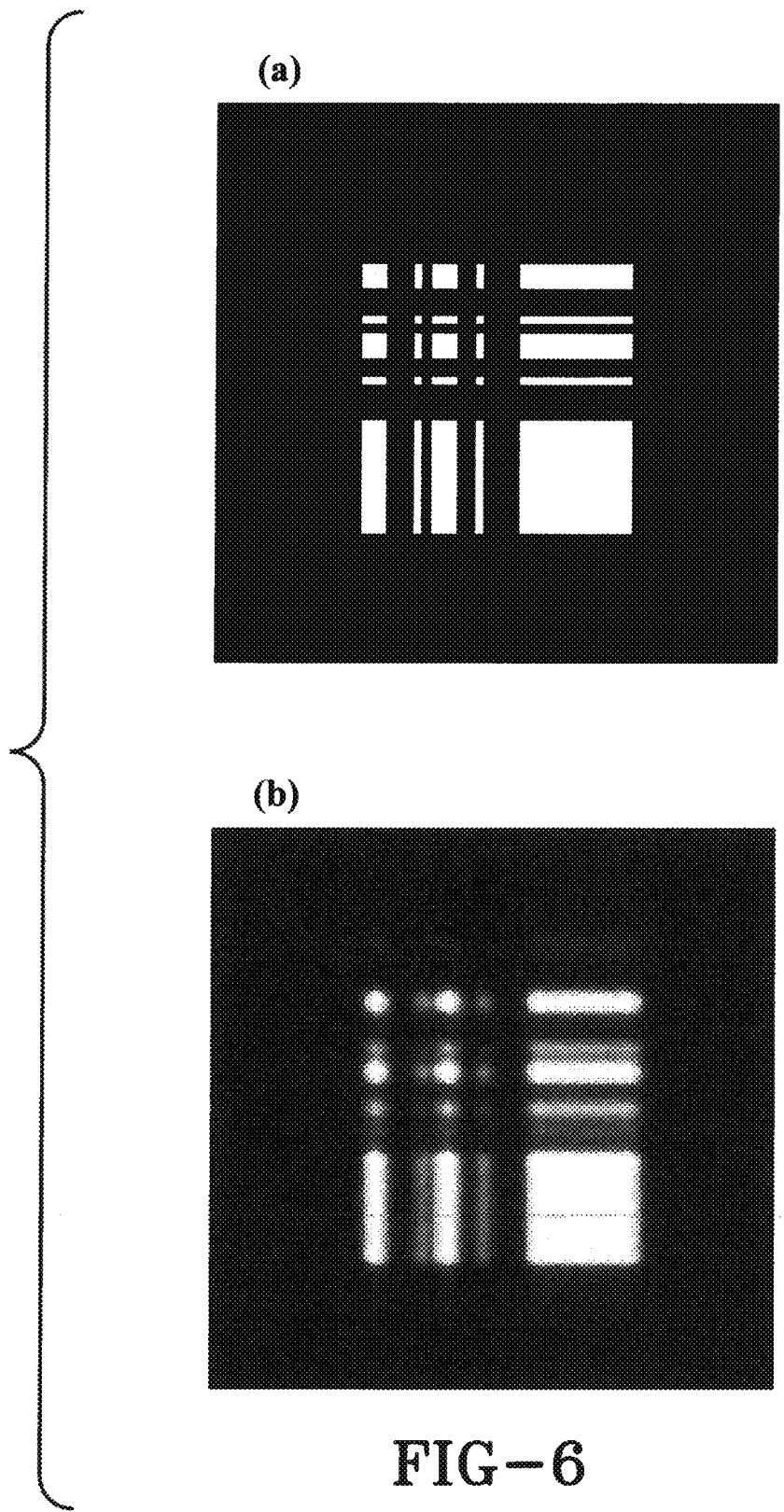
Figure 7:
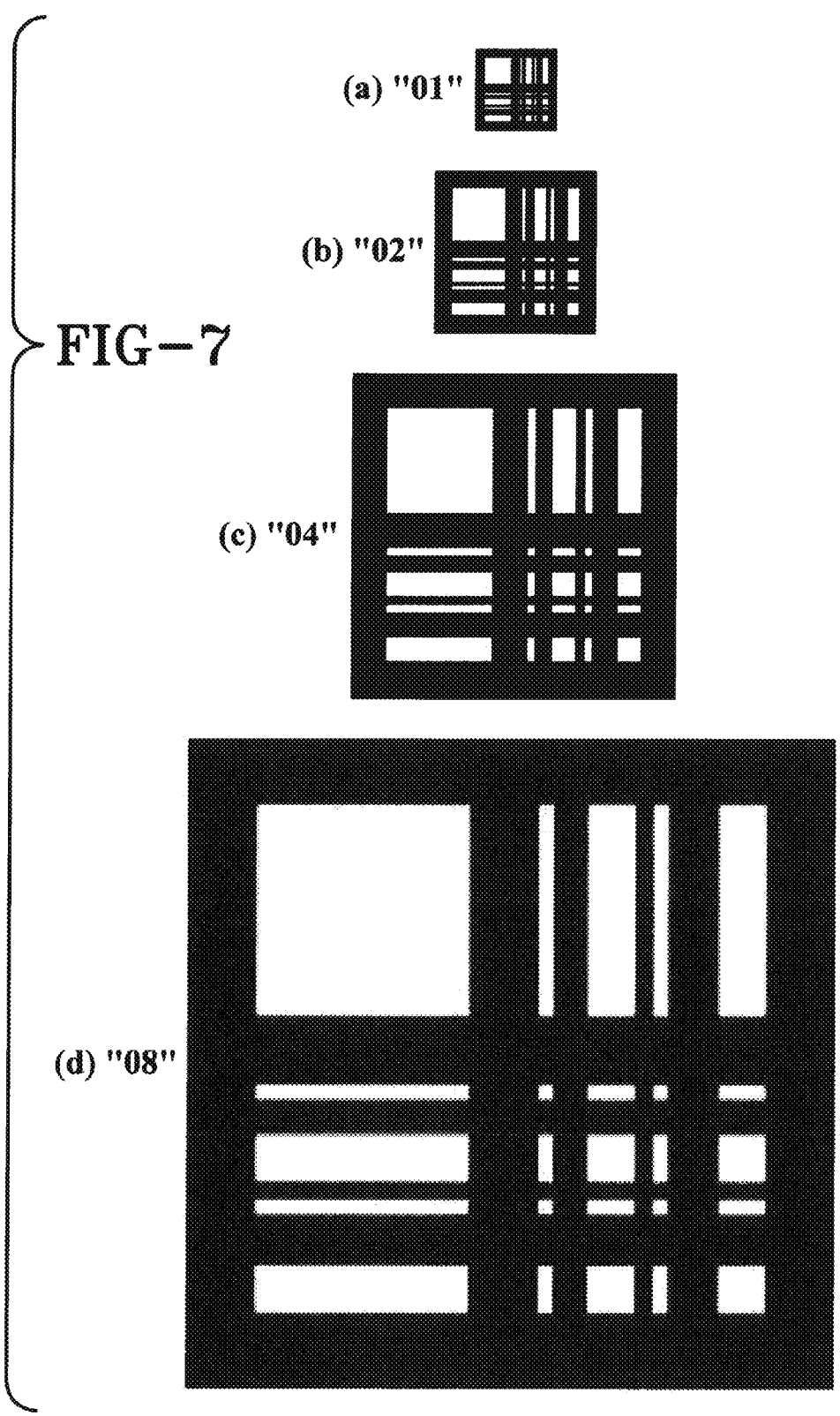
Figure 8A:
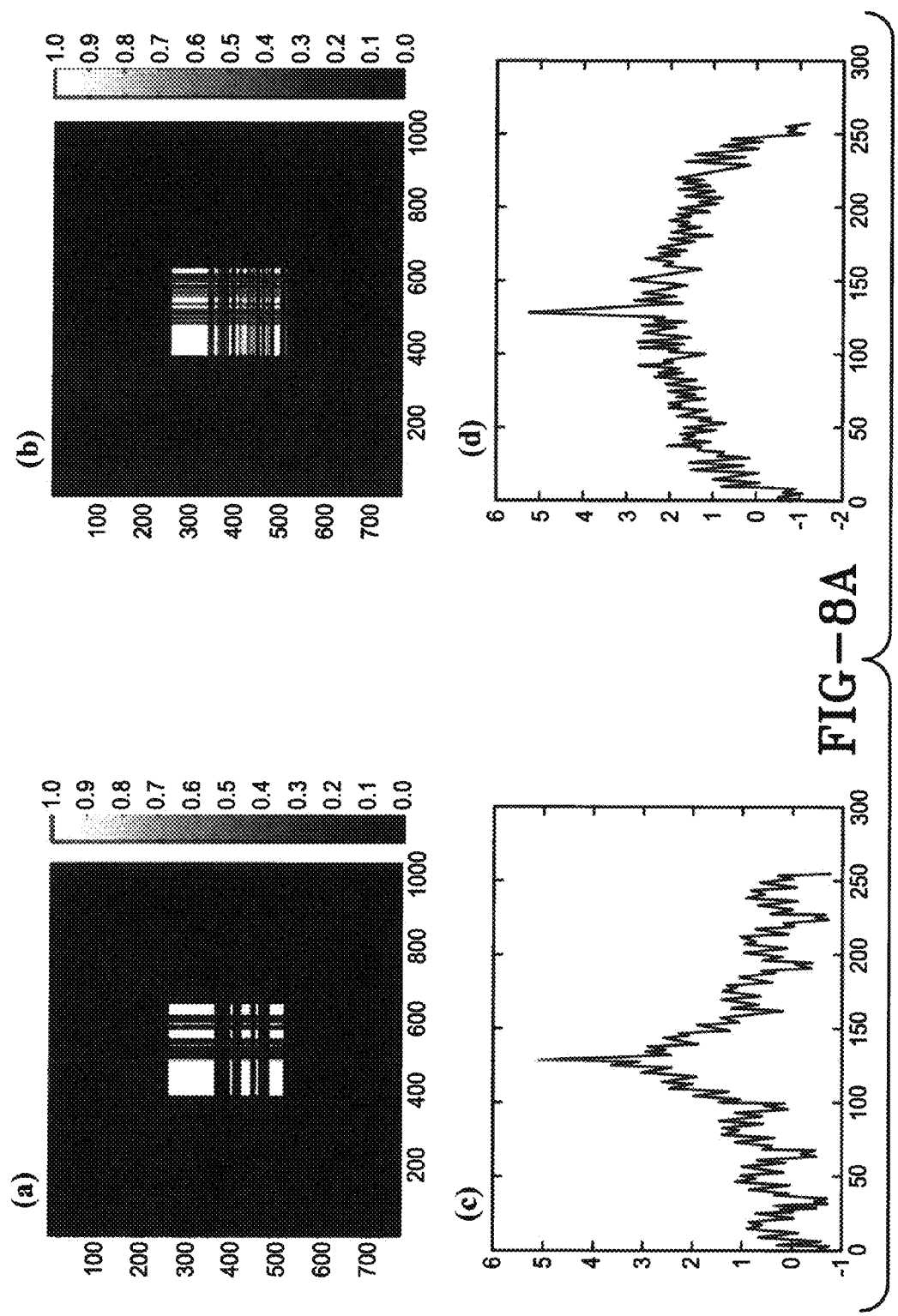
Figure 8B:
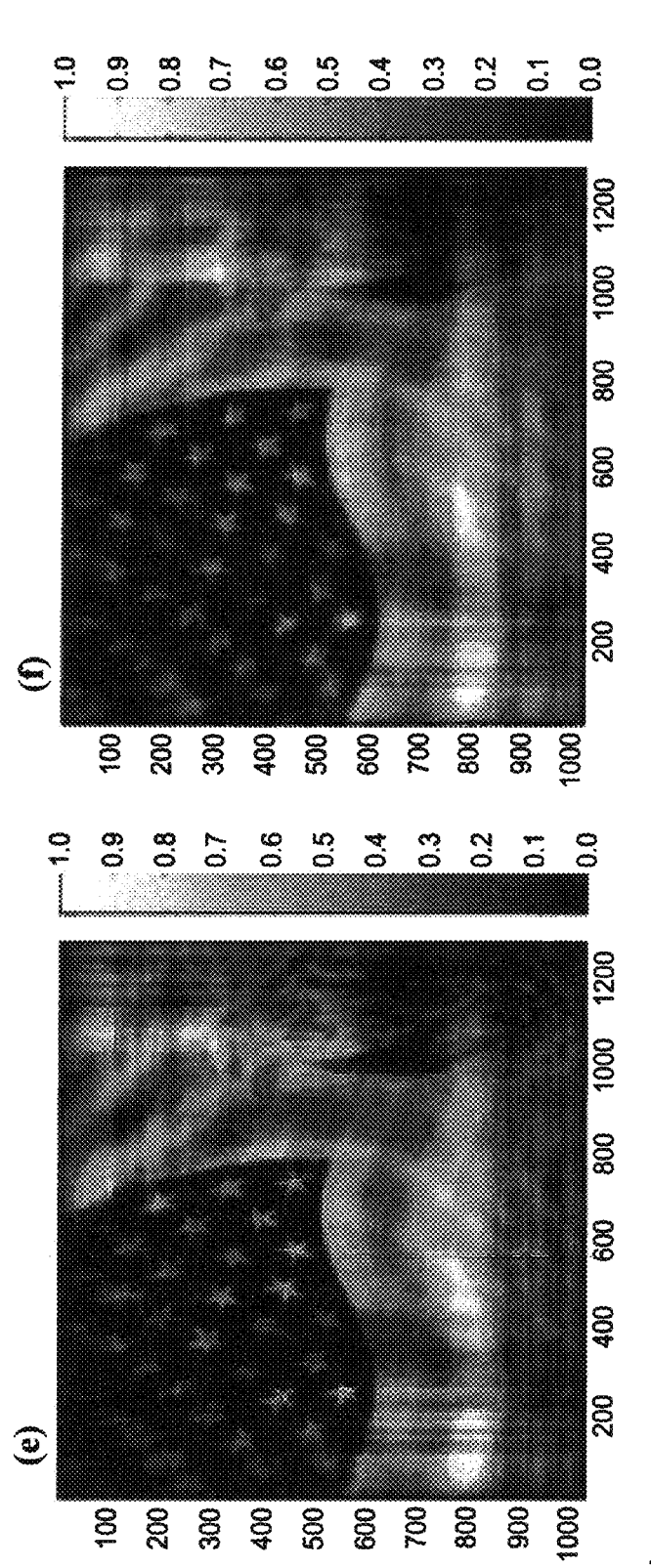
Figure 9:
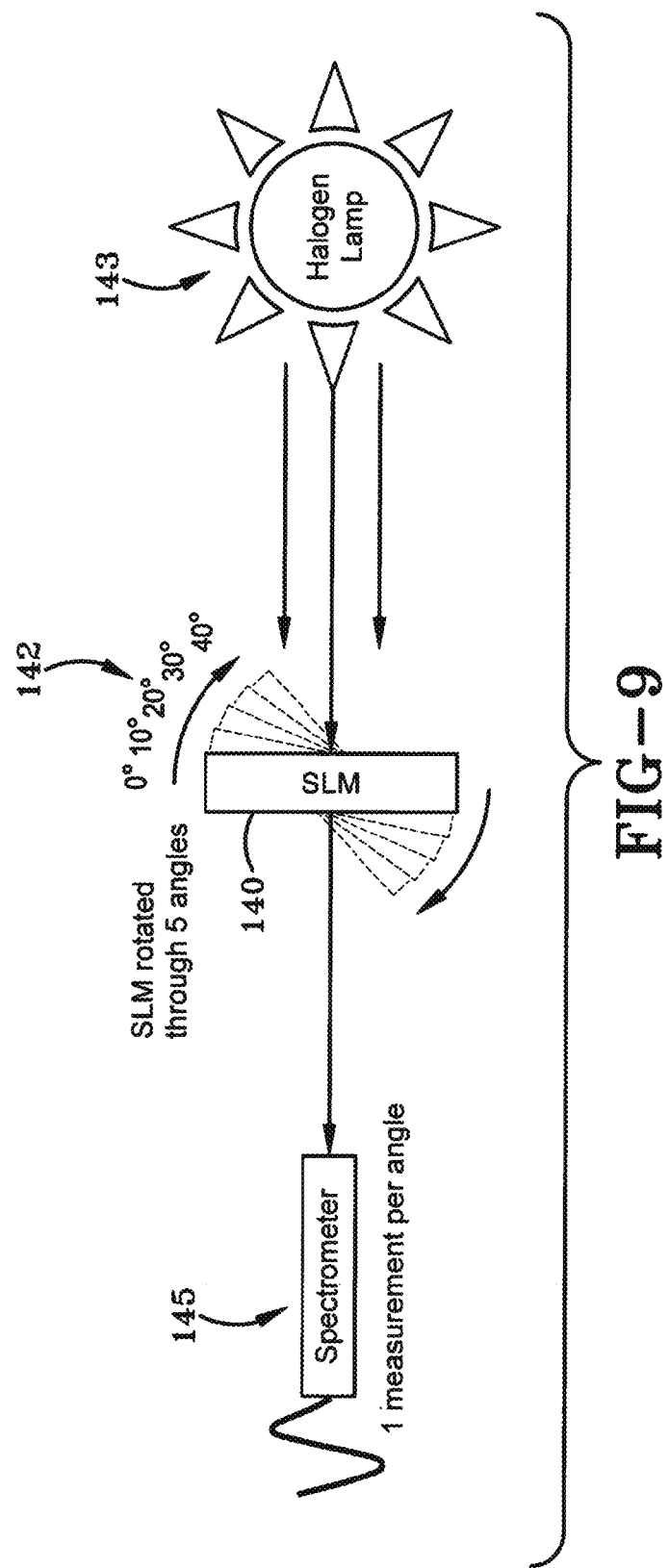
Figure 10:
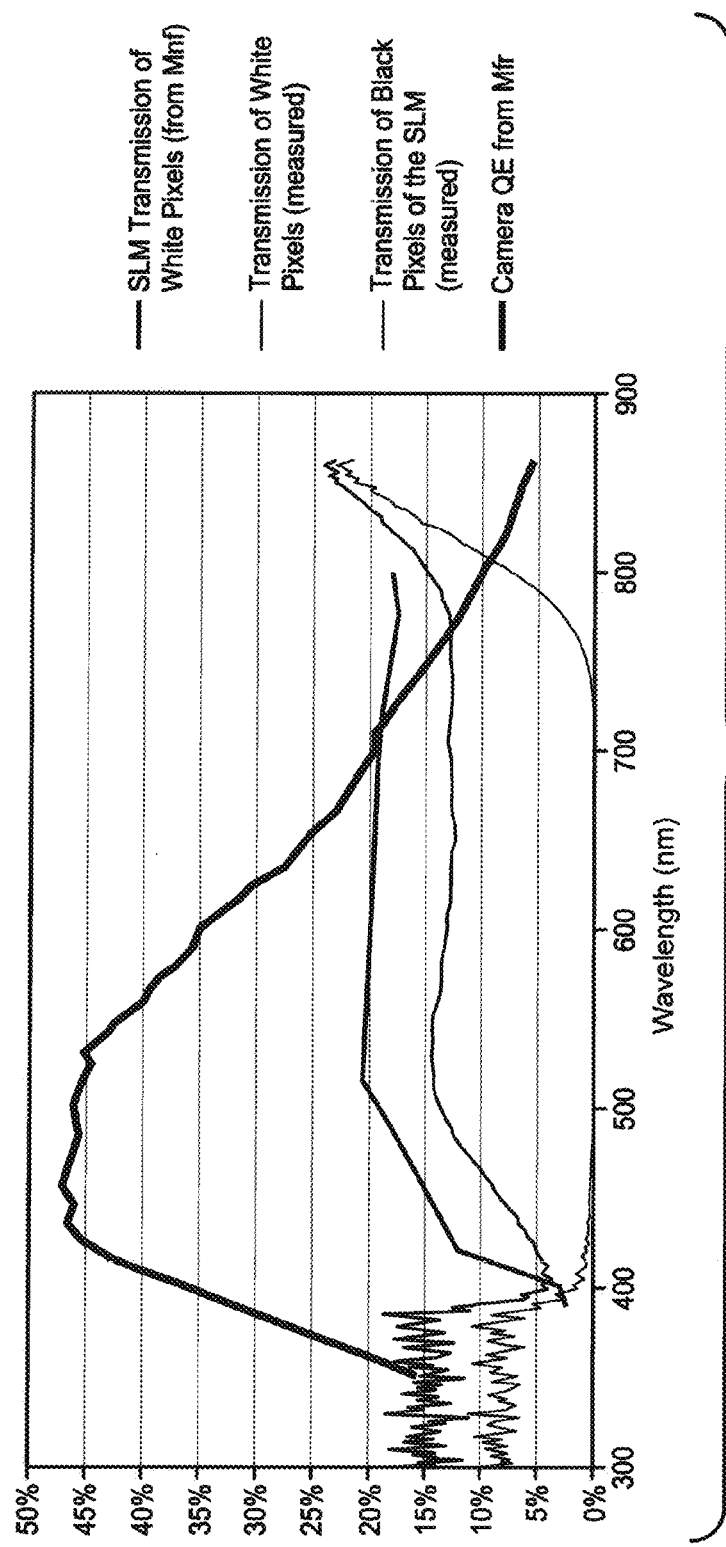
Figure 11:
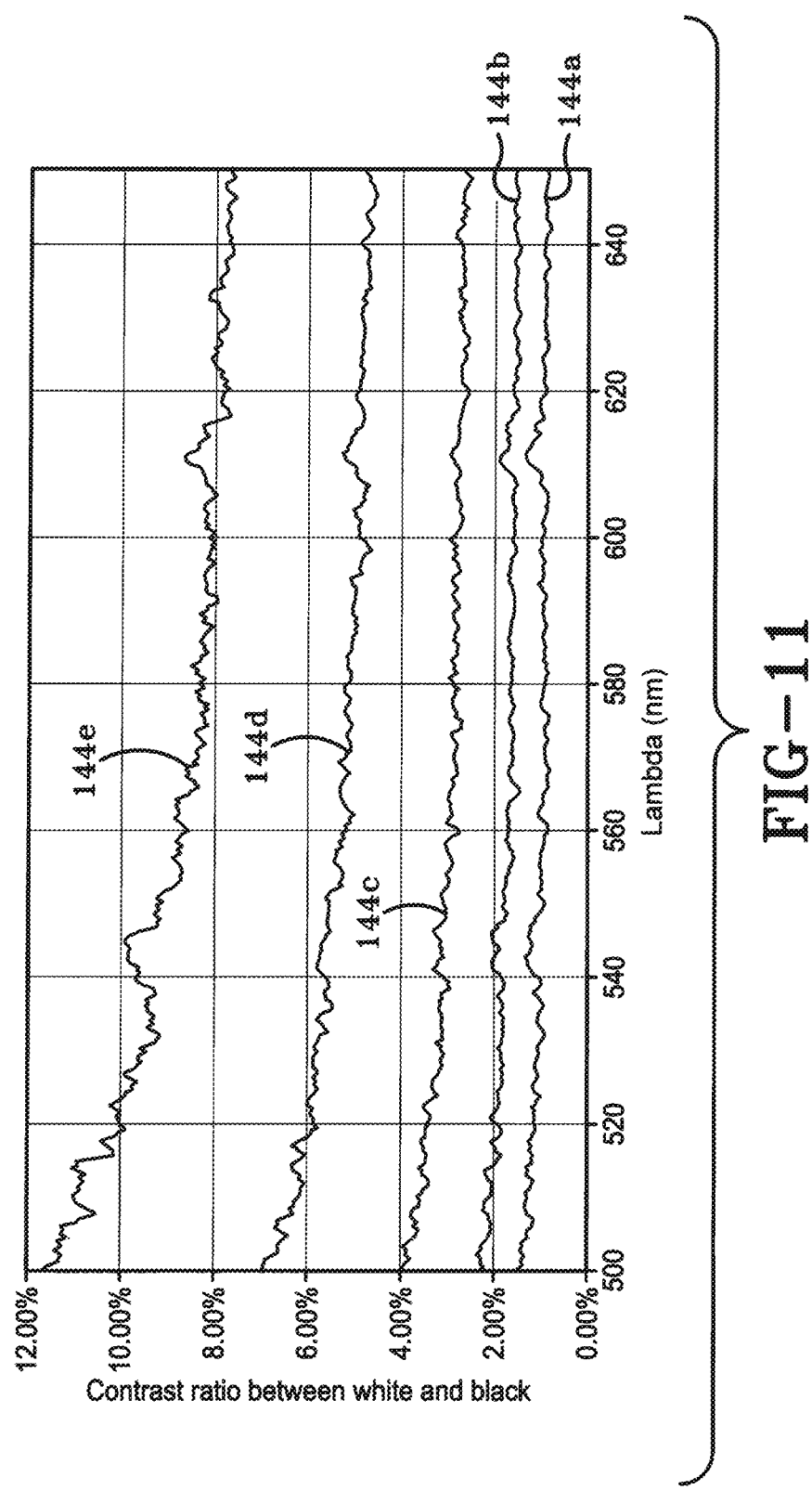
Figure 12:
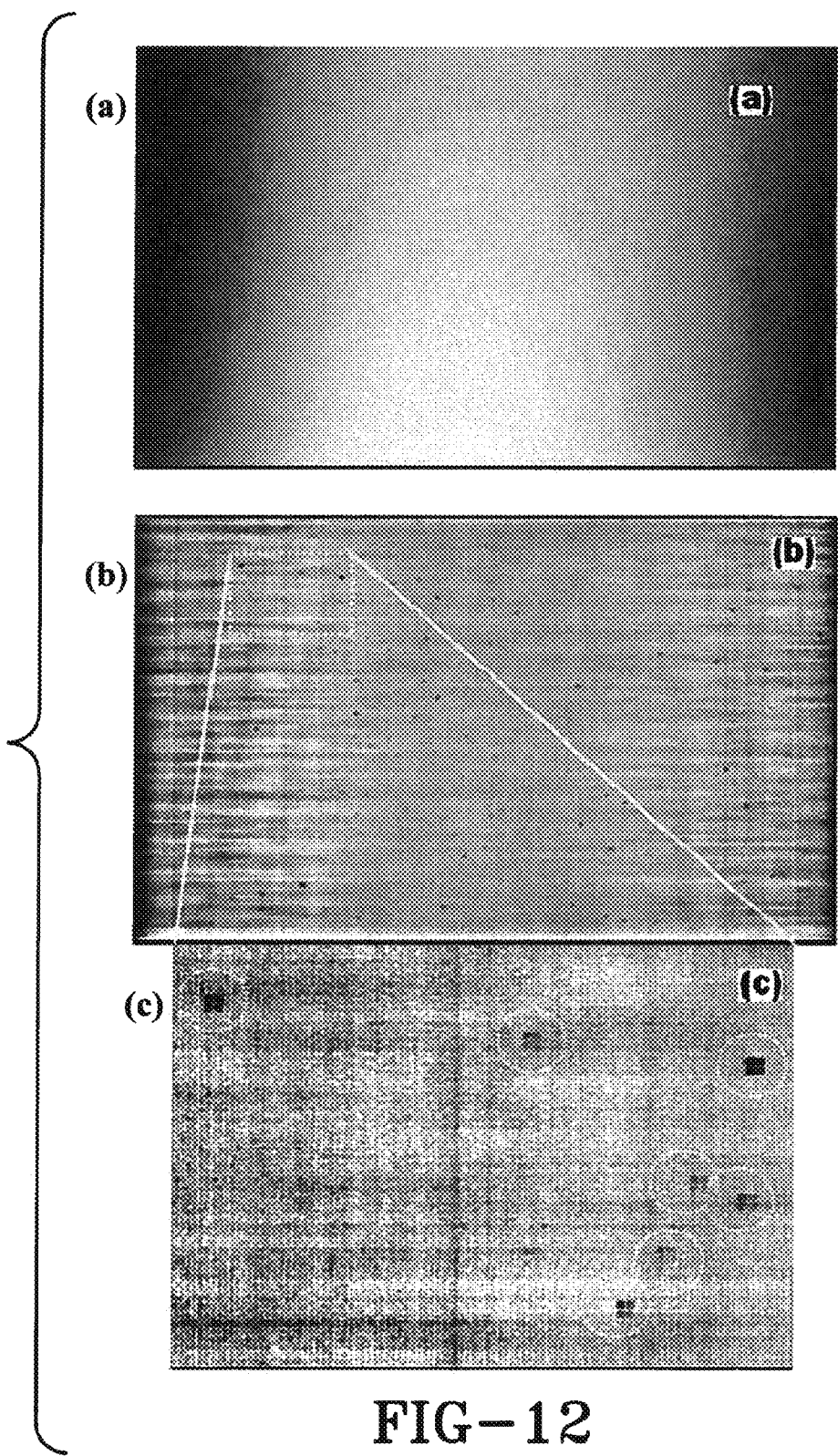
Figure 13:
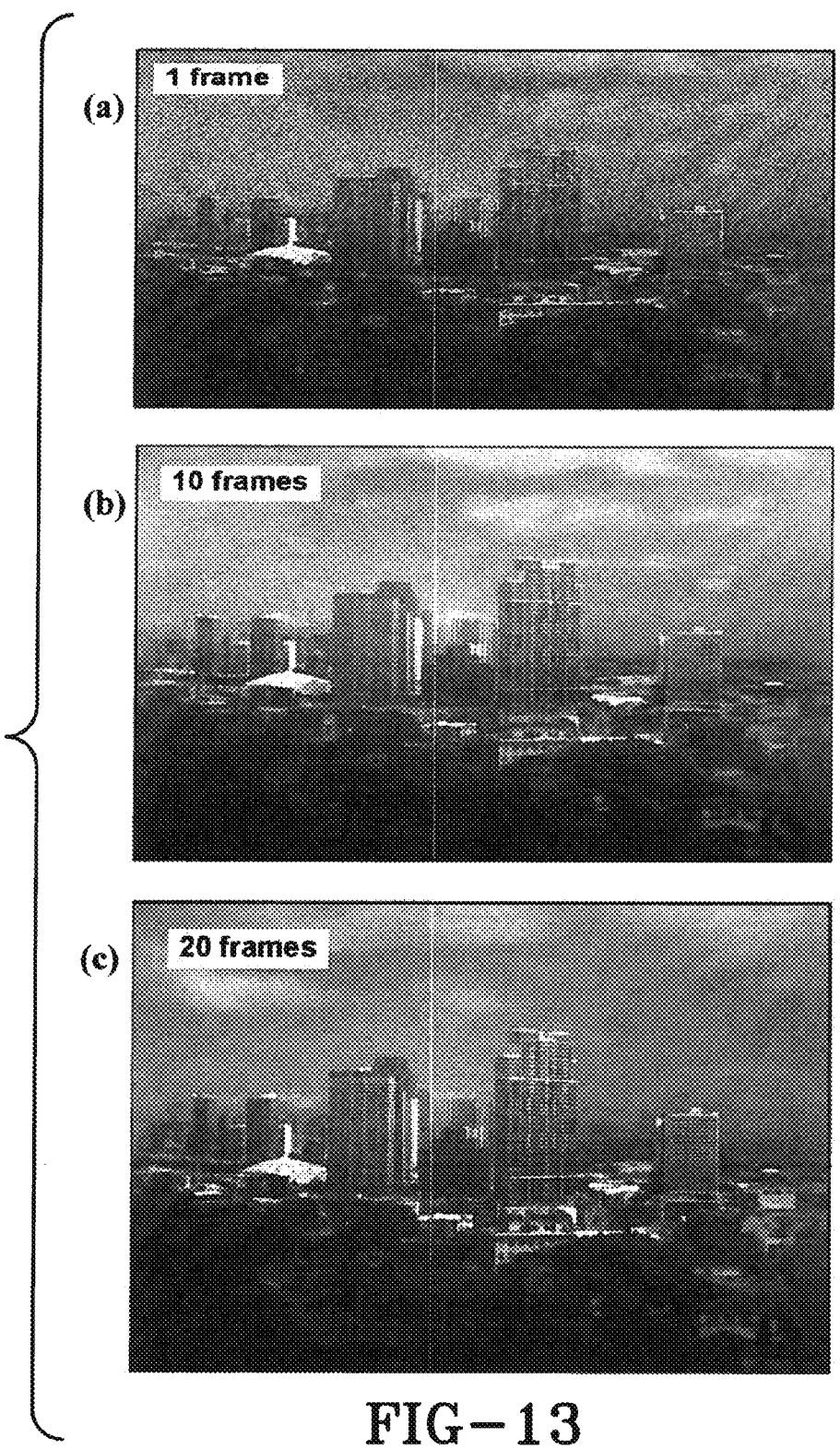
Figure 14:
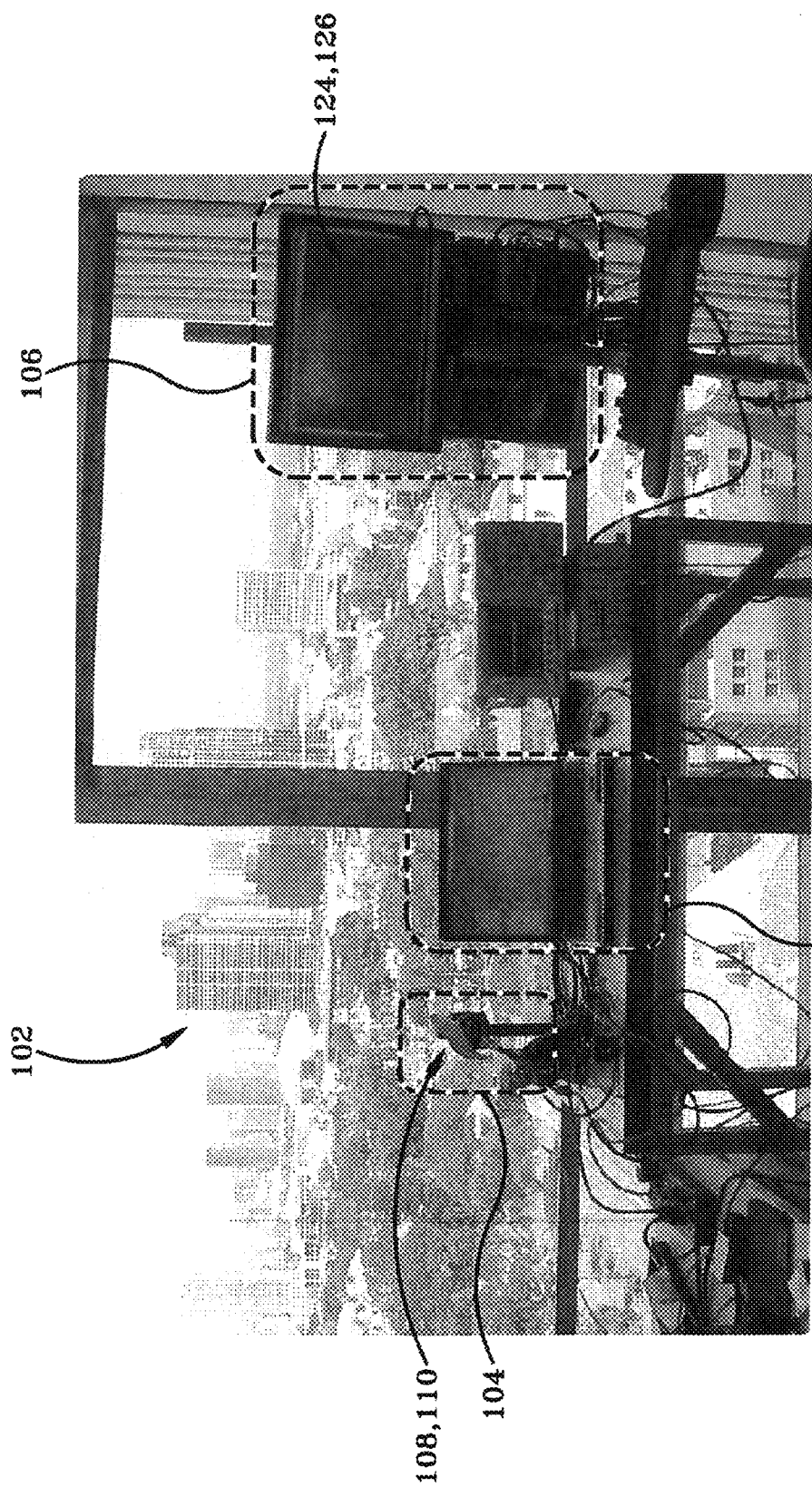
Figure 16:
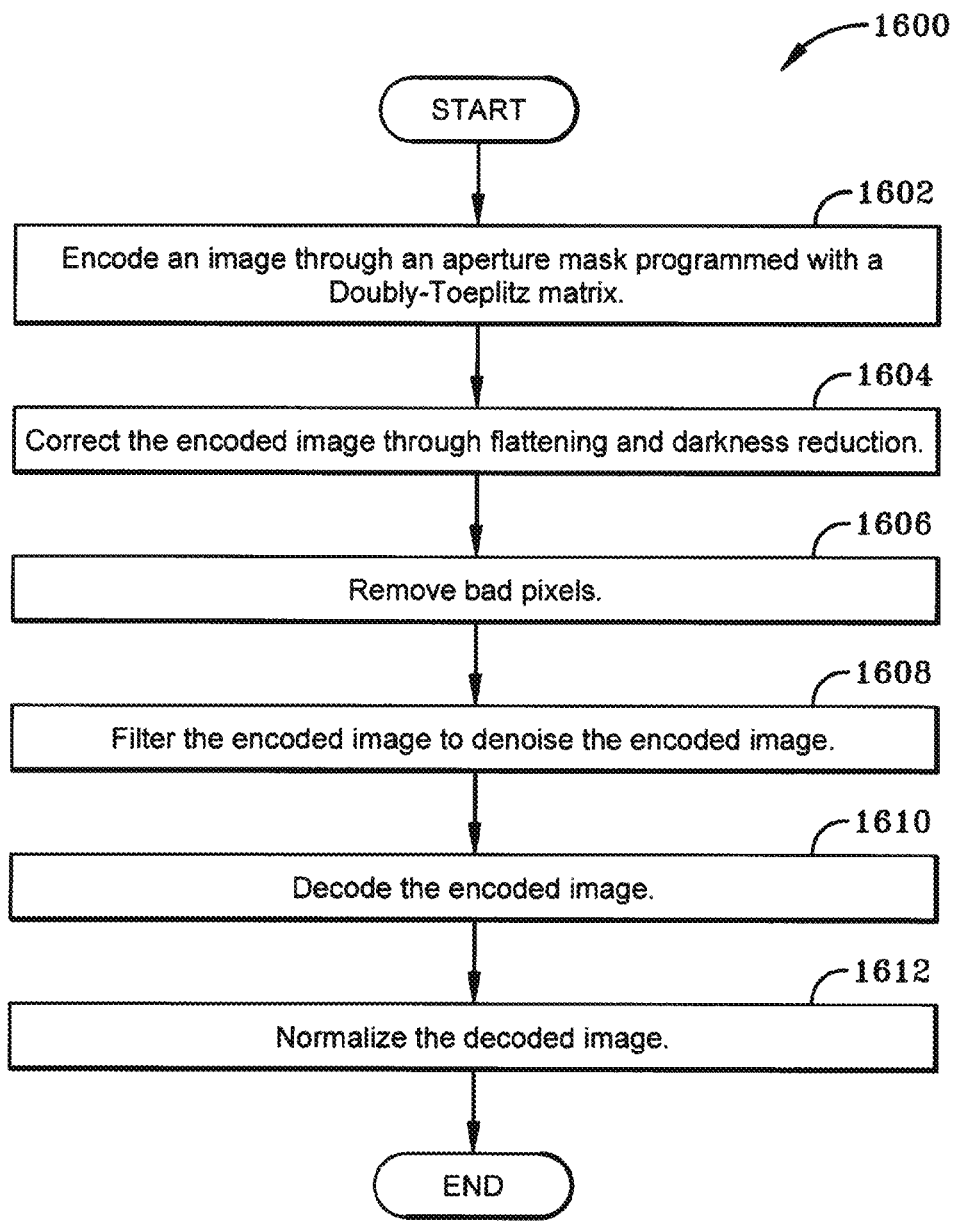
Figure 17:
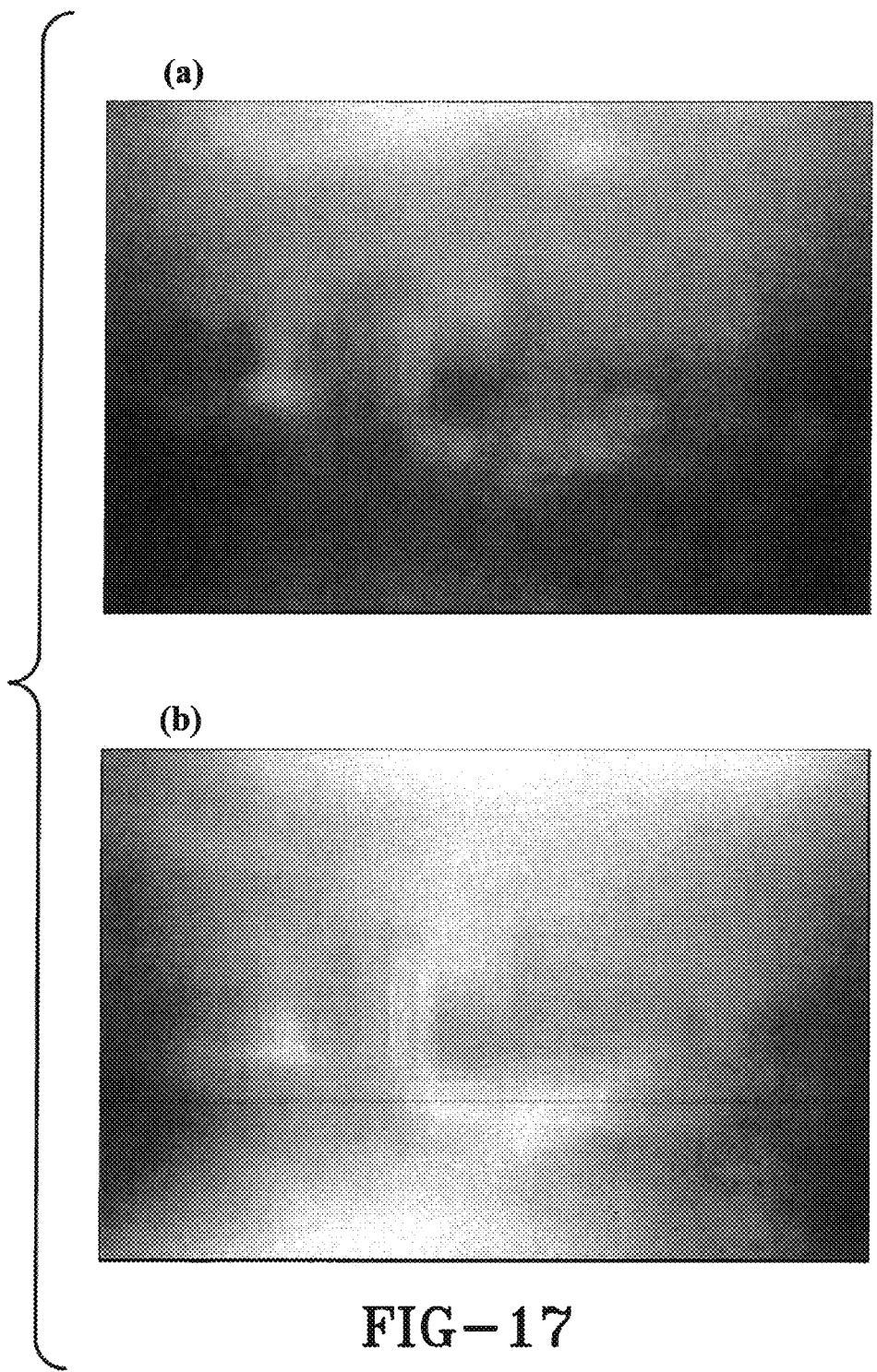
Figure 18:
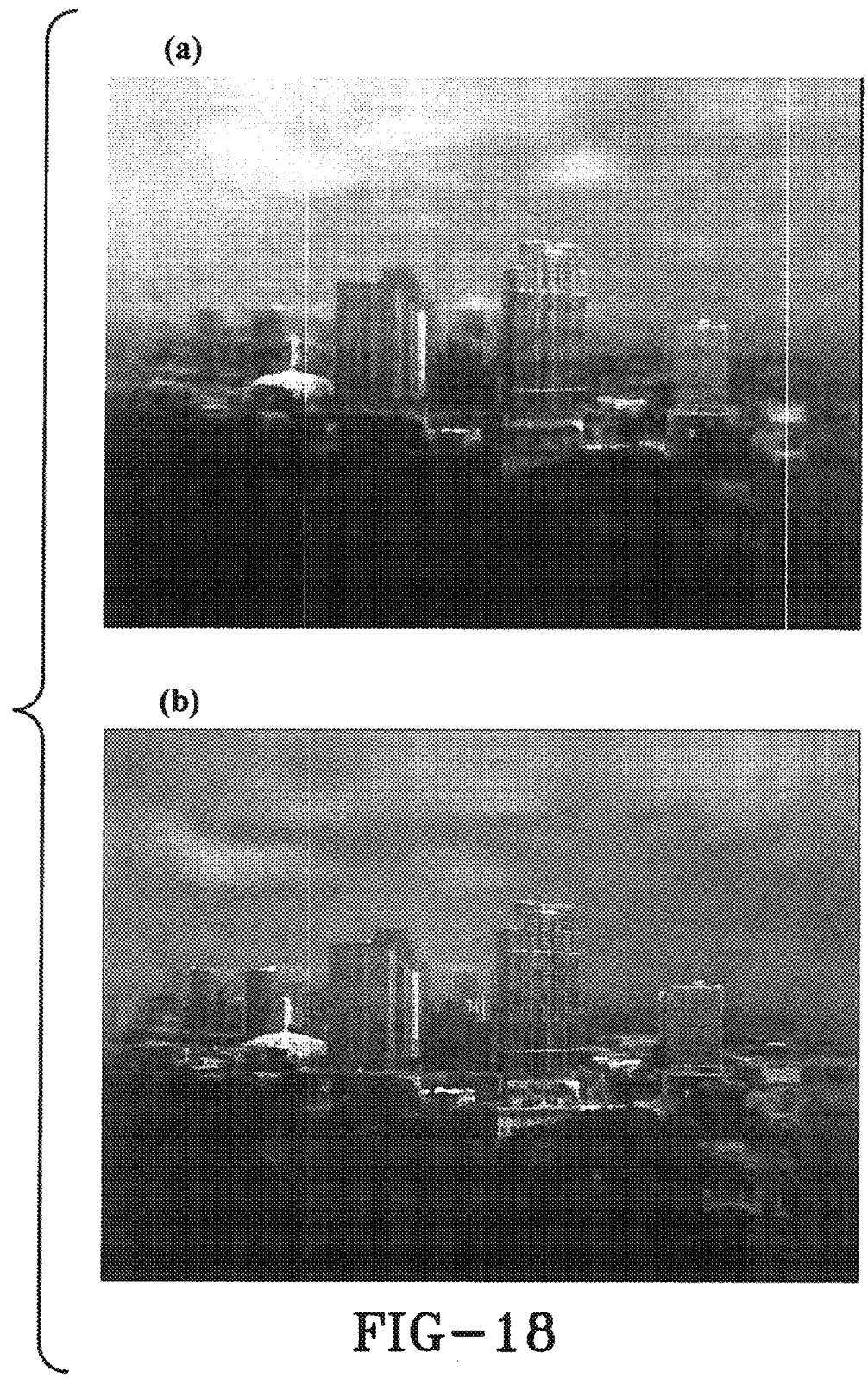
Figure 19:
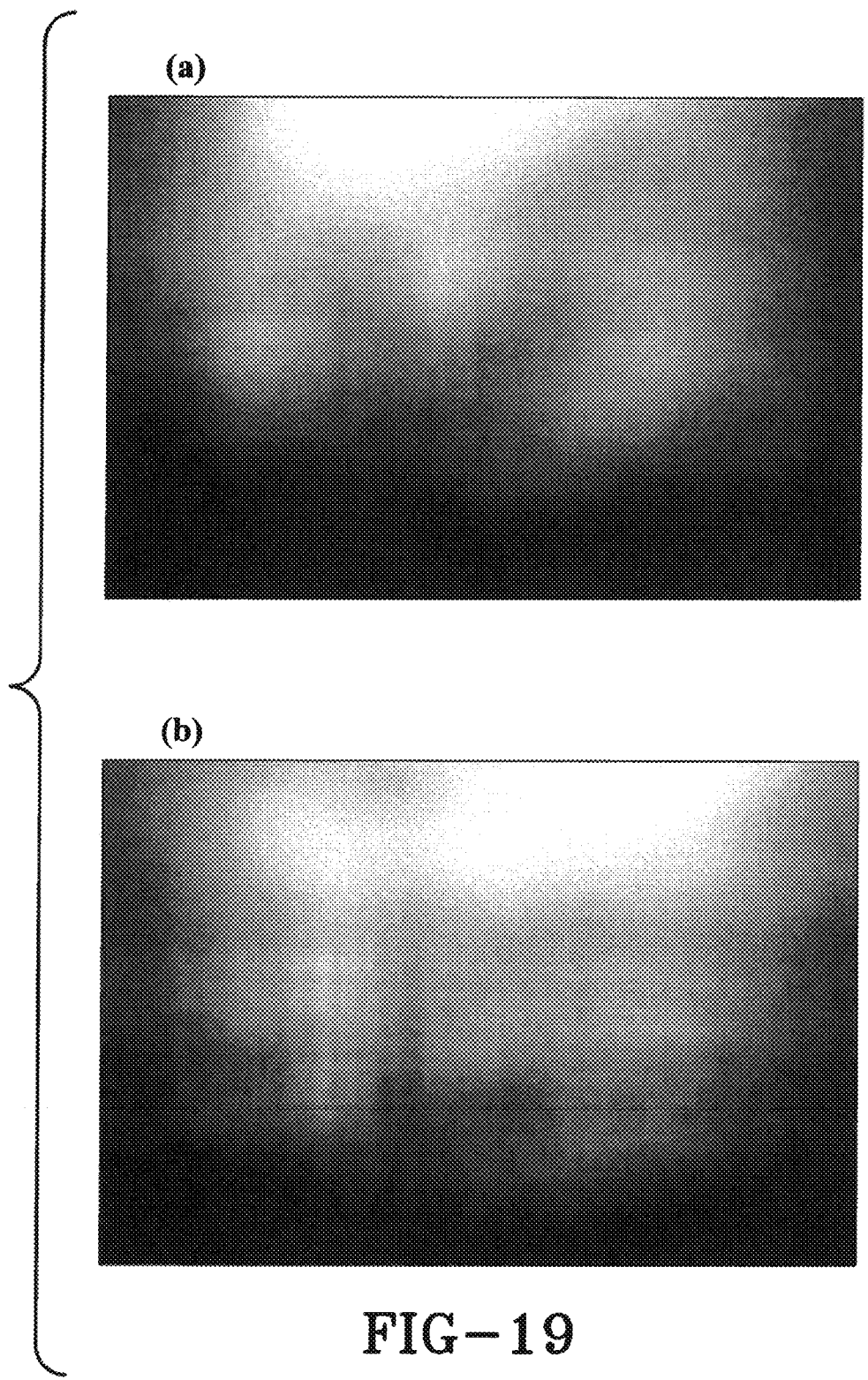
Figure 20:
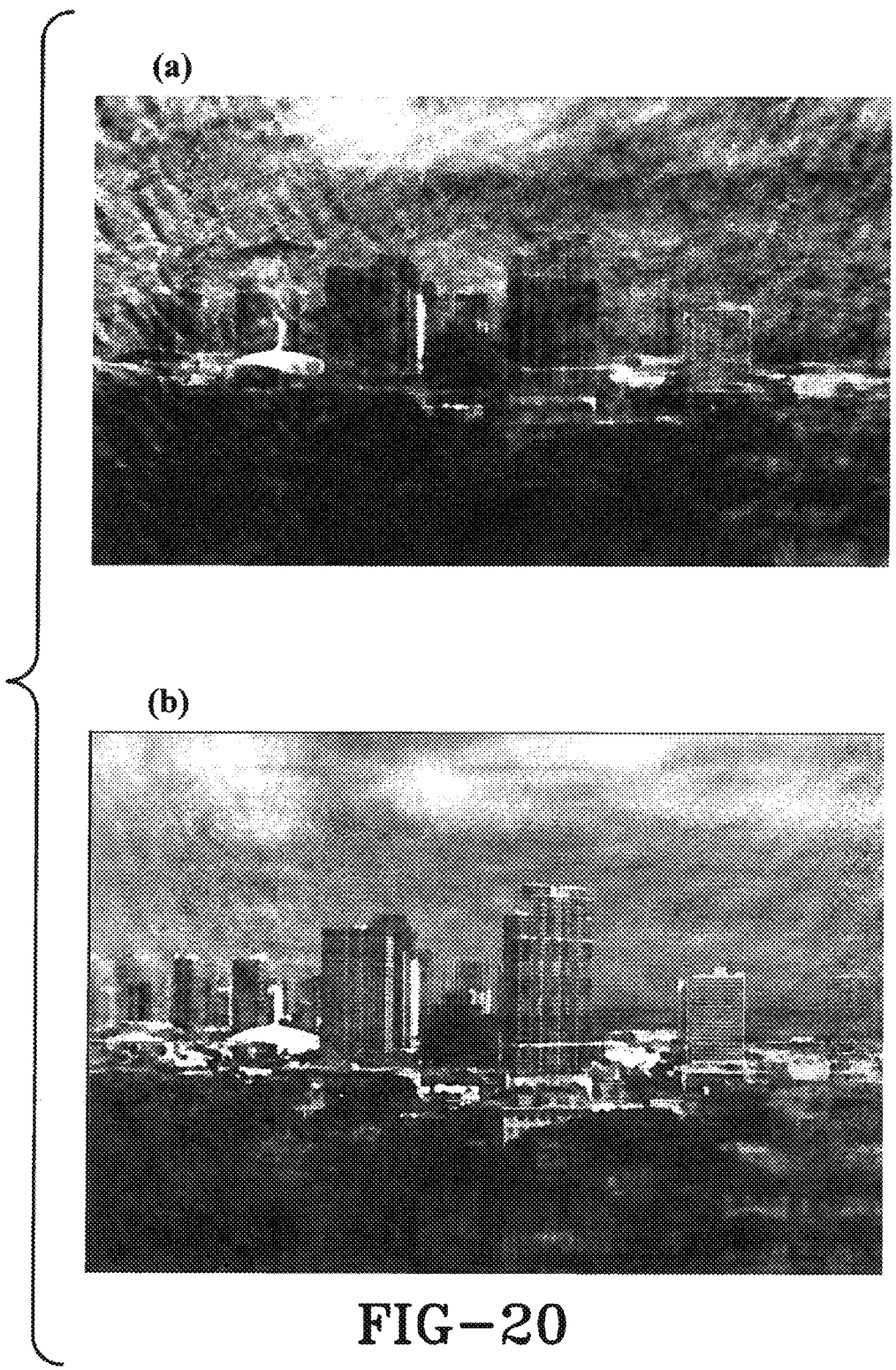
Figure 21:
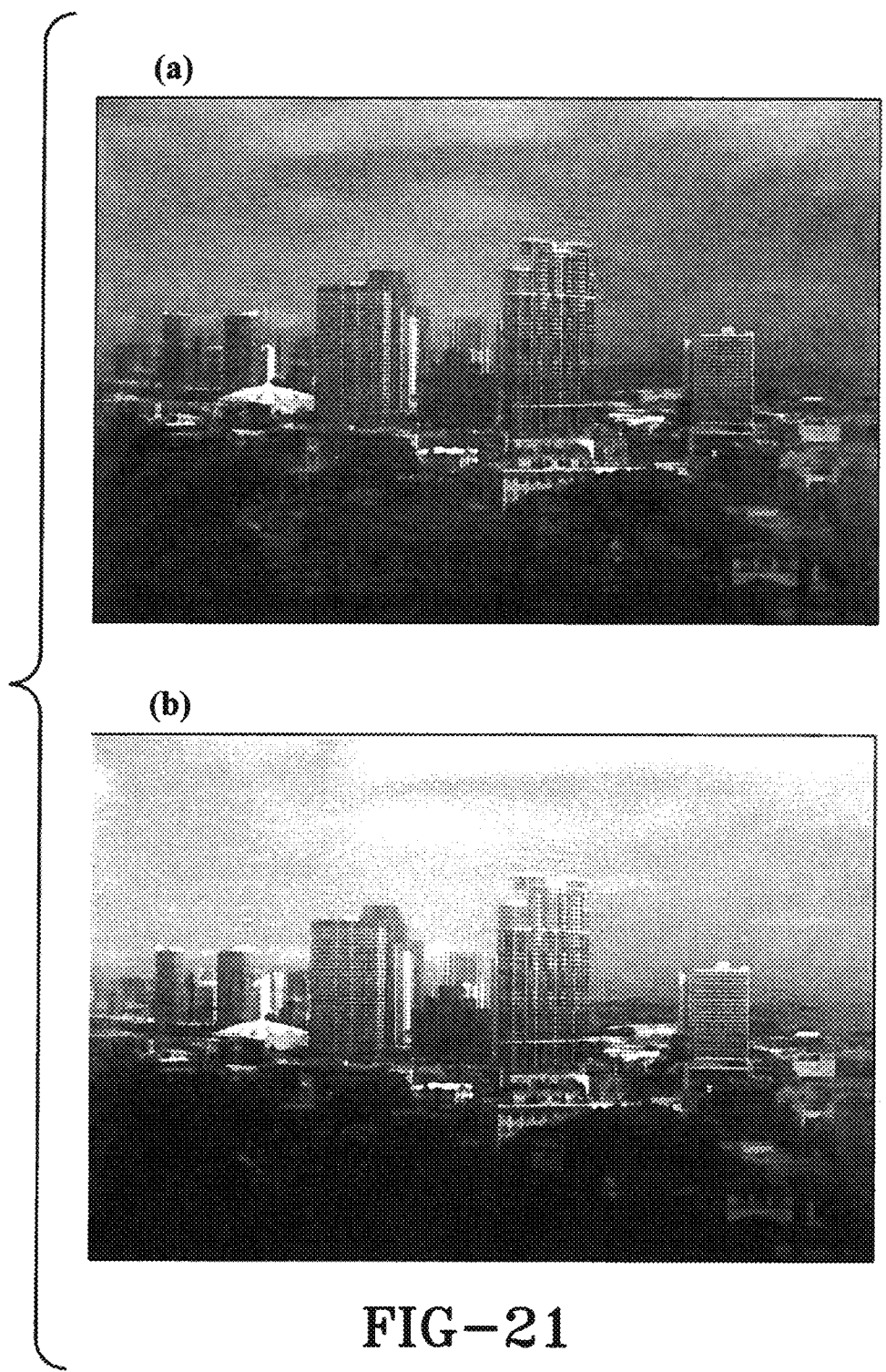
Figure 22:
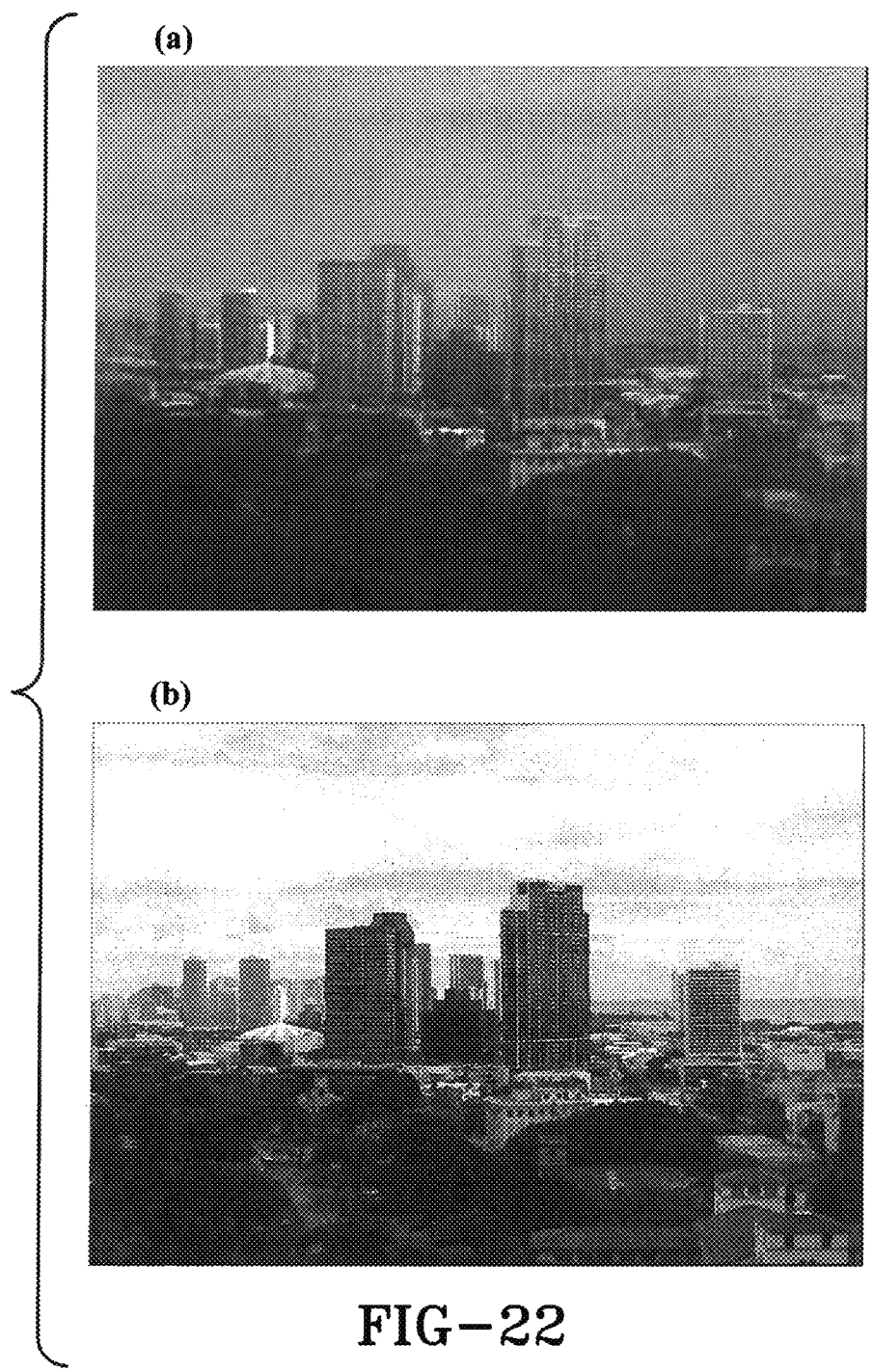

depicts the normalized image, and panel (e) depicts the reconstructed image after iteration using Equation;

FIG. 6 depicts in panel (a) binary aperture mask commanded or programmed on a Spatial Light Modulators SLM and panel (b) depicts its diffracted version;

FIG. 7 depicts a plurality of doubly-Toeplitz coded-aperture masks, and the dimensions are given in terms of SLM elements on a 36-micron pitch, such that, the "01" mask of panel (a) is an outer product of two identical 1-dimensional vectors, and the other masks are simply scaled up from the "01" mask, the "02" mask of panel (b) measures 62×36 microns=2.2 mm on each side, the "04" mask of panel (c) measures 124×36 microns=4.5 mm on each side, and the "08" masks of panel (d) measures 248×36 microns=8.9 mm on each side;

FIG. 8A depicts a comparison of two Candidate-Masks compared in terms of their fast Fourier transforms, wherein panel (a) and panel (b) are exemplary masks that meet a 70%—throughput criterion, panel (c) is the natural logarithm of the FFT of the mask-generating sequence of panel (a), and panel (d) is the natural logarithm of the FFT of the mask-generating sequence of panel (b);

FIG. 8B is a continuation of the comparison made in FIG. 8A wherein panel (e) depicts the decode image obtained through the mask in panel (a) and panel (f) depicts the decoded image obtained through the mask in panel (b);

FIG. 9 depicts a set up for spectral/angular throughput/extension dependency measurements;

FIG. 10 is a graph depicting Spectral Dependence versus wavelength at normal incidence;

FIG. 11 is a graph showing contrast ratio as a function of wavelength and angle;

FIG. 12 shows effects of inside-the-camera reflections, in three different panel perspectives, namely panel (a), panel (b), and panel (c);

FIG. 13 depicts decoded images showing reduction in high-spatial-frequency random noise by averaging multiple frames, wherein panel (a) shows a single frame, panel (b) shows ten averaged frames, and panel (c) shows twenty averaged frames;

FIG. 14 depicts equipment set-up for imaging outdoor scenes, viewing the area shown in FIG. 15, this view looks from downtown Honolulu westward towards Diamondhead mountain (which is mostly obscured by high-rise buildings);

FIG. 15 depicts in top panel (a) a photograph of an urban object scene and in bottom panel (b) a decoded image acquired with "02" masks encoded on SLM;

FIG. 16 shows processing flow for coded-aperture image acquisition and decoding;

FIG. 17 depicts in panel (a) raw images from a small square pinhole aperture and in panel (b) depicts images from a coded-aperture mask having the same square pin area as depicted in panel (a);

FIG. 18 shows processed images from the images obtained and depicted in FIG. 17, panel (a) is associated with panel (a) in FIG. 17 and panel (b) is associated with panel (b) in FIG. 17;

FIG. 19 depicts in panel (a) raw images from a large square pinhole aperture and in panel (b) images from a coded-aperture mask having the same open square pinhole aperture area as depicted in panel (a);

FIG. 20 shows processed images from the images obtained and depicted in FIG. 19, panel (a) is associated with panel (a) in FIG. 19 and panel (b) is associated with panel (b) in FIG. 19;

FIG. 21 shows final results of processing real imagery wherein panel (a) depicts the multi-mask with four 90-degree rotations of the "02" mask and wherein panel (b) depicts using a single mask, showing reduction of magnitude of some decoding "ghost" artifacts; and FIG. 22 shows in top panel (a) a decoded scene shown in FIG. 21 and at the bottom panel (b) a reference photo of the scene acquired with a conventional camera (note: the clouds are different because the images were acquired at different times).

Similar numbers refer to similar parts throughout the drawings.

DETAILED DESCRIPTION

Figure 1:
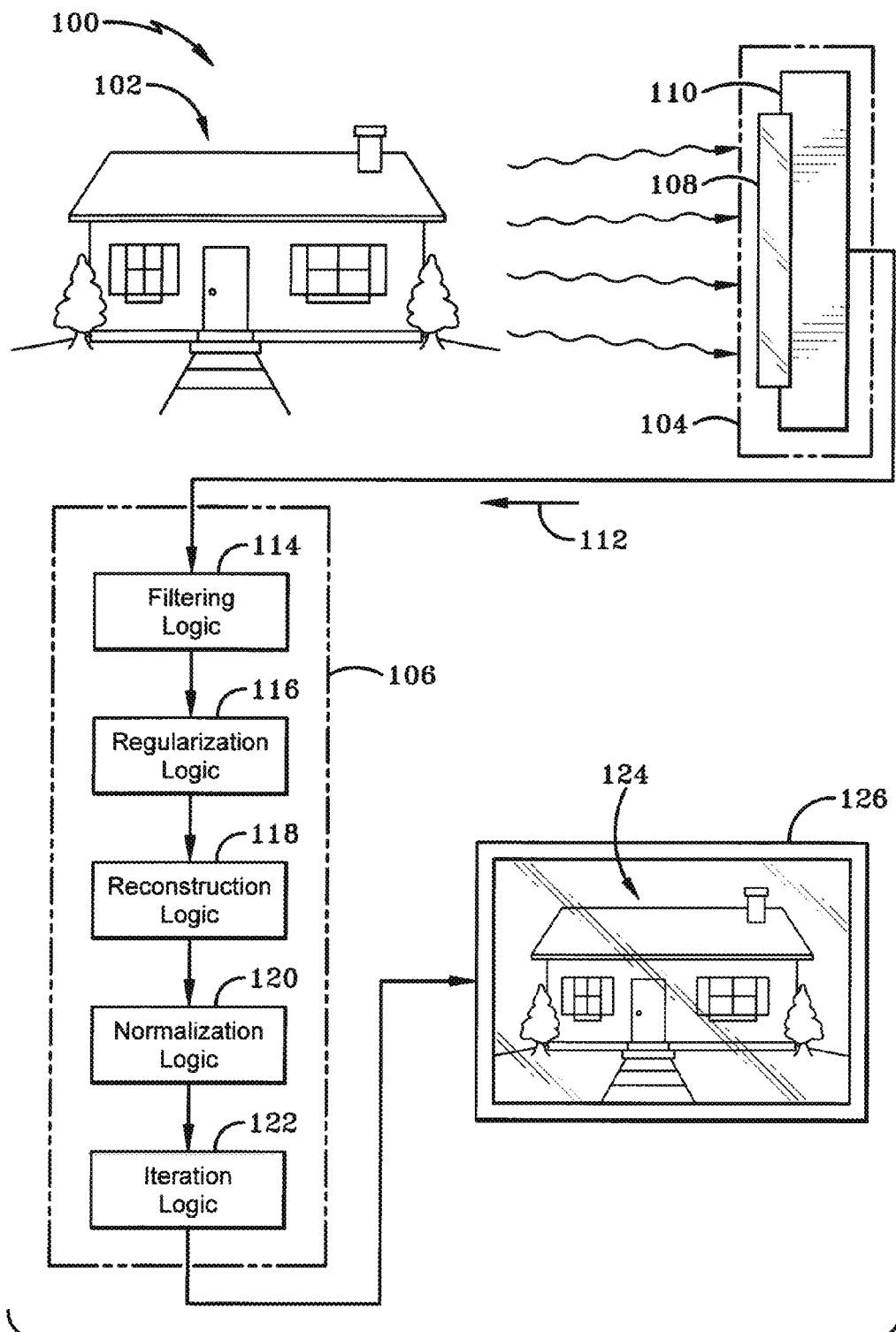
FIG. 1 is a schematic representation of the coded image system of the present invention including an encoding logic portion and a decoding logic portion.

As depicted in FIG. 1, a coded image system of the present invention is depicted generally at 100. The image system 100 comprises a physical object scene 102, an encoding logic 104, and a decoding logic 106. The encoding logic 104 includes a programmable aperture mask 108 electronically coupled with a camera or imager 110 spaced a distance away from the physical object scene 102. Mask 108 receives light waves partially therethrough, as will be discussed in greater detail below. The encoding logic 104 creates an encoded image 112 via a doubly-Toeplitz matrix programmed on mask 108, the doubly-Toeplitz matrix produced by two one-dimensional vectors as will be described further below. The decoding logic 106 is configured to decode the encoded image recovering a visual representation 124 of the object scene from the encoded image. The decoding logic includes a filtering logic 114, a regularization logic 116, a reconstruction logic 118, a normalization logic 120, and a iteration logic 122. Once decoding logic 106 has recovered the encoded image the visual representation 124 may be displayed in a monitor 126 or alternatively print media. The physical object scene is 102 is non-uniform, including various angles, shapes, lighting, hues, and colors. The order of the processing steps can be varied, and steps may be combined.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

The doubly-Toeplitz matrix may be realized in a medium selected from a group comprising a programmable aperture mask 108, a non-programmable aperture mask, a liquid crystal spatial light modulator, an eyelid array, and a self-supporting printed member, however other mediums are entirely possible. The doubly-Toeplitz matrix permits radiation through openings defined by the matrix and blocks radiation through non-openings defined by the matrix, wherein the radiation is selected from the group comprising visible light, x-rays, gamma rays, UV light, and infrared light. The use of a doubly-Toeplitz matrix in the encoding logic, causes the problem of partial mask encoding to be more tractable, thus enabling efficient algorithmic methods for inverting the system transfer function.

Additionally, the use of the doubly-Toeplitz matrix in the encoding logic is more accurate than previously known spatial light encoding functions. The doubly-Toeplitz matrix encoding allows for the inversion of the encoding function. When on a programmable mask, the doubly-Toeplitz matrix are separable and produce fewer zero eigenvalues than decodings with non-separable masks. Thus, there are fewer random decoding artifacts introduced, yielding more accurate reconstruction of the scene being imaged. Thus, some images that could not be decoded with prior art, are now accurately decodable.

By way of some further background, fixed (non-programmable) coded-aperture technology and programmable aperture masks electronically coupled to cameras and realized with Spatial Light Modulators (SLM) were heretofore known in the art. The SLM elements are controlled to modulate a transmission so that the modulated transmission forms an aperture mask, encoding an image I with a programmed function M, so that:

$$I = M \otimes O, \text{ or, in terms of matrix elements:} \quad (1)$$

(1)
$$I_{i,j} = \sum_{k,l} M_{k,l} O_{k+i,l+j}. \quad (2)$$

The goal of decoding is to use knowledge of the aperture mask function M to recover the object scene O from the encoded image I.

Figure 2:
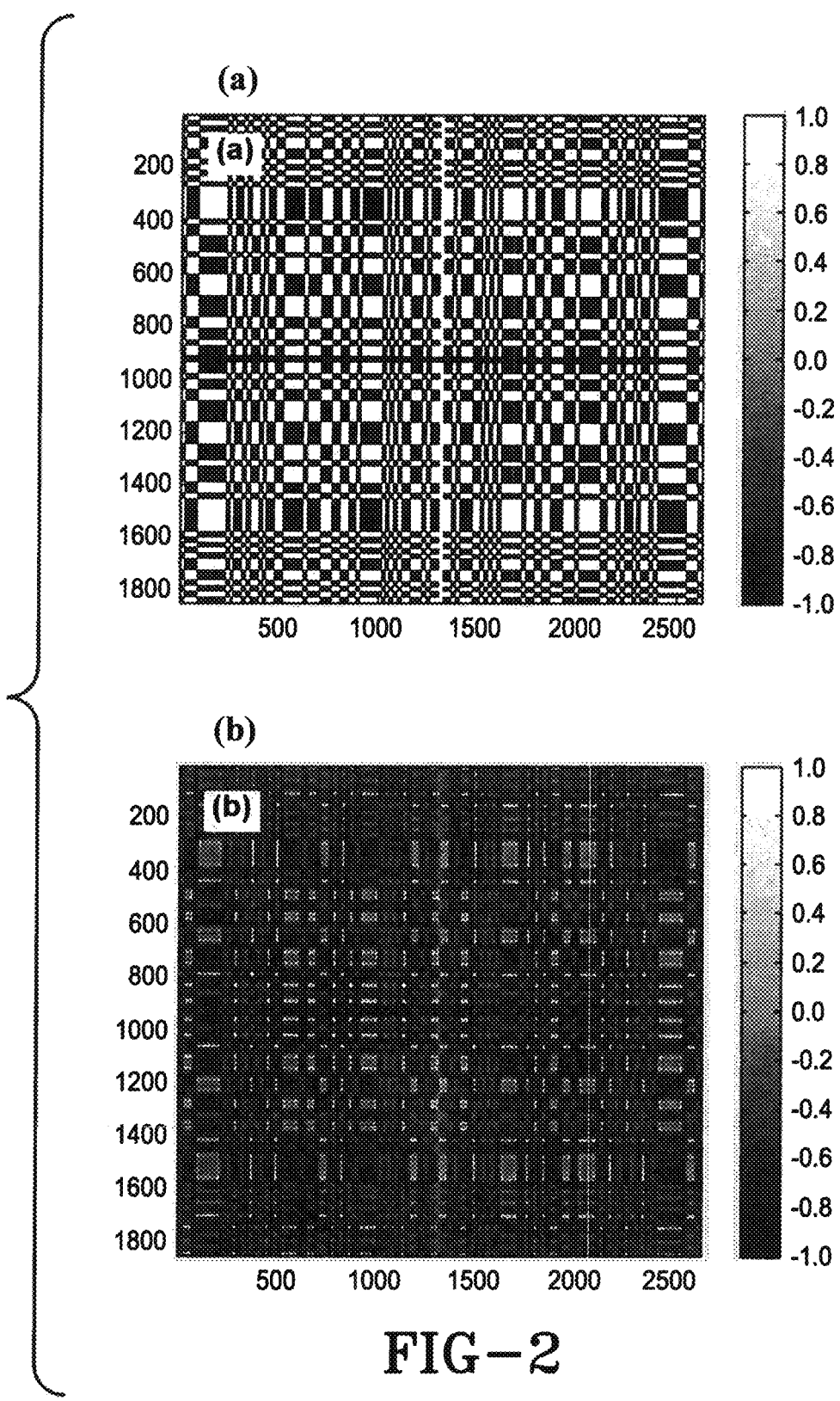
FIG. 2 is an example of a modified uniformly redundant array (MURA) mask wherein panel (a) is an ideal binary mask, and panel (b) is a collected mask showing effects of diffraction features.

The mathematical state of the art prior to this application was to select binary codes which could be inverted via forward correlation with slightly-modified versions of themselves. Specifically, mask codes or the programmable function M were selected for which the masks were simply a collection of binary (0% or 100% transparent) elements. Exemplary binary masks 108 programming function M are depicted in FIG. 2. An inverse matrix G (inverse of function M), such that $$O_{Estimated} = G \otimes I = G \otimes M \otimes O \approx O, \quad (3)$$

was easily derivable from M itself. For example, for Uniformly Redundant Array masks:

$$G_{i,j} = \begin{cases} +1, & M_{i,j} = 1 \\ -1, & M_{i,j} = 0 \end{cases}. \quad (4)$$

Information-theoretic analyses had identified that the Uniformly Redundant Arrays (URAs) and Modified URAs (MURAs) satisfied Equation (3) under periodic boundary conditions.

In addition to ease of decoding, an advantage of inverse G matrices which satisfy Equation (3) is that an image of a point source viewed through the mask programmed with function M is simply a scaled version of the decoding mask G, already properly registered to the image I. This removes registration as a source of decoding errors.

FIG. 2 is an example of a modified uniformly redundant array (MURA) mask wherein panel (a) is an ideal binary mask, and panel (b) is a collected mask showing effects of diffraction features. In this case, the MURA was lithographically deposited as a pattern on a glass slide, so that it was truly binary, either passing (100% transparent) or blocking light (0% transparent). The diffracted collected mask in panel (b) shows effects of scattering and diffraction, compromising the self-inverse property. In addition, as is explained below, even ideal MURAs also have the drawback of having limited utility for extended scenes.

The most straightforward approach for regularized inversion is to invert Equation (1) by Fourier transform. Investigations with SLMs revealed noisy low-contrast recovered images, and efforts to diagnose the causes were complicated by effects such as diffraction, polarization, and non-uniform SLM-element throughput. To separate those effects, non-programmable masks were lithographically patterned on glass. The lithographic masks had the same dimensions and element sizes as the MURA patterns programmed for the SLMs, so that only they should provide the best possible quality MURAs for encoding.

Imaging with non-programmable lithographic masks eliminated confounding effects, until the research traced performance limitations to the effects of incomplete encoding of extended scenes on a finite focal plane. This effect, called Partial-Mask Encoding, was intractable with straightforward Fourier decoding—the incomplete capture of the mask shadow on the image plane caused too much loss of information.

Via numerical simulations, it was determined that the presence of noise made regularized decoding even more difficult, with the noise effects being amplified by the partial-mask decoding process.

To solve the problem with partial-mask encoding, the inventors implemented regularized decoding by introducing a real, positive function $c^2k$. In terms of Fourier Transforms, the decoding became:

$$O_{Recovered}(k) \approx \frac{I(k)M(k)}{|M(k)|^2 + c^2(k)} \approx \frac{I(k)M(k)}{|M(k)|^2 + (1/SNR^2(k))}, \quad (5)$$

where the last equality holds if the noise is uncorrelated with the signal. With regularization, recognizable decodings of laboratory images were achieved with both non-programmable lithographic and programmable-SLM masks.

However with regularization, it is still difficult to decode extended scenes which are typical of non-laboratory imaging. While it was possible to decode images of objects set against a uniform black background, decoded images of extended scenes usually were unrecognizable. The inventors traced this to the use of Fourier decoding, which has the limitations of implicitly assuming cyclic or periodic behavior of the object O. This is not a serious drawback for compact objects against an extended uniform background, as is the case with astronomical imaging (for which coded-apertures were originally invented). However, Fourier decoding has severely limited performance for very-extended scenes having significant partial-mask encoding.

To relax the assumption of cyclic boundaries, the inventors returned to imaging theory and re-cast the decoding problem in the most general terms. The correlation of a programmable mask filter function M with an object scene O to yield an image I in Equation (1) can also be expressed as a simple matrix multiplication:

$$I1 = M'' \cdot O1, \text{ so that } I1_i = \sum_k M''_{i,k} O1_k. \quad (6)$$

Where I1 and O1 are 1-dimensional vectors created by concatenating the rows of I and O respectively, such that:

$$I1_{C_I*i+j}=I_{i,j}, \text{ and } O1_{C_O*i+j}=O_{i,j}, \quad (7)$$

where $C_I$ and $C_O$ are the numbers of columns in I and O respectively. The matrix M" has rows which are shifted copies of the first row, which is constructed from the filter function M by embedding each row of function M into a segment of length $C_O$, padded with zeros for elements $C_F+1$ through $C_O$, then concatenating the segments into a row of length $C_O*R_O$, where $R_O$ is the number of rows in O. That is, $$M''_{l,C_O*i+j} = \begin{cases} M_{i,j} & \text{for } j \in \text{ the first } C_F \text{ columns} \\ 0 & \text{for } j \in \text{ later columns} \end{cases}.$$

For example, consider a 3×3 filter function M" (identified as f below in equation 8), and a 4×4 object scene O filtered to yield a 2×2 image I.

$$\begin{bmatrix} I_{00} & I_{01} \\ I_{10} & I_{11} \end{bmatrix} = \begin{bmatrix} f_{00} & f_{01} & f_{02} \\ f_{10} & f_{11} & f_{12} \\ f_{20} & f_{21} & f_{22} \end{bmatrix} \otimes \begin{bmatrix} O_{00} & O_{01} & O_{02} & O_{03} \\ O_{10} & O_{11} & O_{12} & O_{13} \\ O_{20} & O_{21} & O_{22} & O_{23} \\ O_{30} & O_{31} & O_{32} & O_{33} \end{bmatrix} \quad (8)$$

Expressed as a matrix multiplication, this correlation is given by Equation (9):

$$\begin{bmatrix} I_{00} \\ I_{01} \\ I_{10} \\ I_{11} \end{bmatrix} = M'' \cdot \begin{bmatrix} O_{00} \\ O_{01} \\ O_{02} \\ O_{03} \\ O_{10} \\ O_{11} \\ O_{12} \\ O_{13} \\ O_{20} \\ O_{21} \\ O_{22} \\ O_{23} \\ O_{30} \\ O_{31} \\ O_{32} \\ O_{33} \end{bmatrix}, \text{ with} \quad (9)$$

$$M'' = \begin{bmatrix} f_{00} & f_{01} & f_{02} & 0 & f_{10} & f_{11} & f_{12} & 0 & f_{20} & f_{21} & f_{22} & 0 & 0 & 0 & 0 & 0 \\ 0 & f_{00} & f_{01} & f_{02} & 0 & f_{10} & f_{11} & f_{12} & 0 & f_{20} & f_{21} & f_{22} & 0 & 0 & 0 & 0 \\ 0 & 0 & 0 & 0 & f_{00} & f_{01} & f_{02} & 0 & f_{10} & f_{11} & f_{12} & 0 & f_{20} & f_{21} & f_{22} & 0 \\ 0 & 0 & 0 & 0 & 0 & f_{00} & f_{01} & f_{02} & 0 & f_{10} & f_{11} & f_{12} & 0 & f_{20} & f_{21} & f_{22} \end{bmatrix} \quad (10)$$

The size of the matrix M" grows as the sizes of the image and the filter mask grow. If the image has dimensions $r_I$ $c_I$ and the filter has dimensions $r_F$ $c_F$, then the sampled object is of size $r_O$ $c_O$, with $r_O=(r_I+r_F-1)$ and $c_O=(c_I+C_F-1)$. This yields for the matrix M" dimensions of $(r_I*c_I)$ rows and $(r_O*c_O)$ columns.

The forward correlation can be done exactly using Equation (6), which is an improvement on Fourier-transform methods. However, the inverse problem (estimating O from the measurements I) is extremely difficult. This is an ill-posed inversion, inasmuch as there may be many more elements in O than in I. To a degree, this is true of all imagers—real focal planes can collect only a finite number of discrete pixels, and solving ill-posed imaging problems is an active area of research. The general case to estimate O from I, is commonly inverted by solving the regularized normal equations:

$$M''^T I1 = (M''^T M'' + \alpha^2 1_{R_O \times C_O}) O1, \quad (11)$$

where $1_{R_O \times C_O}$ is the identity matrix with each dimension measuring $R_O \times C_O$. Solving Equation (11) requires inverting the square matrix $(M''^T M'' + \alpha^2 1_{R_O \times C_O})$ having dimensions each measuring $r_O \times c_O = (r_I + r_F - 1)$. The operations count for solving Equation (11) is on the order of:

$$N_{Operations, Generalized} \propto (r_O c_O)^3. \quad (12)$$

For images of a size on the order of one megapixel, this yields $10^{18}$ operations, requiring on the order of $10^6$ seconds≈12 days on a teraflops processor. Thus, computations on full-sized images using generalized masks are unlikely to be practical. Further, the matrix M" is so large that accumulation of round-off errors will likely swamp the inversion, even if it could be accomplished in a manageable time.

The inventors investigated a strategy, which the inventors called the megamatrix approach, to make the generalized problem tractable. This megamatrix approach models object space at a lower resolution, such that the inversion problem is well-posed, and is capable of producing very good results in light of partial mask encoding. However, due to the number of computations involved and the accumulation of round-off errors as discussed above, the inventors have concluded that the approach would be limited to images areas measuring only a few hundred pixels.

Beyond MURAs: Invertible Masks

In parallel with the megamatrix approach investigation of Equation (11), aspects of the present invention sought alternate strategies—seeking improved masks which would have both a large open area (to maximize light-gathering) and mitigate the ill-posed partial-mask problem. Even in cases in which the image resolution is extremely dense, so that sampling is not a limiter of reconstruction accuracy, the finite extent of real focal planes causes the correlation of the mask and object, $$I(i, j) \approx \sum_k \sum_l O(k, l) M(i+k, j+l), \qquad (13)$$

to be ill-posed, since the extent of the object O is unbounded, and the programmed mask function M conveys information about O into the limited area of I. The general problem of estimating the elements of O from the observations I is very difficult, even if M is perfectly known. While the forward problem of generating an image from the object O is unique, the inverse problem may have multiple solutions of varying fidelity. In particular, the MURA (Modified Uniformly Redundant Array) masks used for code-aperture imaging yield extremely ill-posed problems when imaging extended scenes.

Doubly-Toeplitz Masks

It is possible to specify finite-sized masks that greatly reduce the degree to which the imaging is ill-posed, and render the inversion of Equation (13) tractable. With respect to encoding logic 104, if the programmable aperture mask 108 programmed with function M can be expressed as an outer product of two one-dimensional vectors A and B, with lengths $N_A$ and $N_B$ respectively, then M is an $N_A \times N_B$-dimensional matrix of the form:

$$M(i,j)=A(i)B(j), \qquad (14)$$

and the convolution Equation (13) can be written simply as a matrix product:

$$I=M_A O M_B^T + N, \qquad (15)$$

wherein a noise term N has been added.

The matrices $M_A$ and $M_B$ have Toeplitz forms, in which each row is a copy of the previous row, with the elements shifted by one pixel on each successive $$\text{row: } M_A = \begin{bmatrix} A_1 & A_2 & \dots & A_{N_A} & 0 & 0 & 0 & \dots & 0 \\ 0 & A_1 & A_2 & \dots & A_{N_A} & 0 & 0 & \dots & 0 \\ \vdots & \ddots & \ddots & \ddots & \ddots & \ddots & \ddots & & \vdots \\ 0 & \dots & A_1 & A_2 & \dots & A_{N_A} & \ddots & \ddots & \vdots \\ \vdots & \dots & \ddots & \ddots & \ddots & \ddots & \ddots & \ddots & \vdots \\ 0 & \dots & 0 & 0 & A_1 & A_2 & \dots & A_{N_A} & 0 \\ 0 & \dots & 0 & 0 & 0 & A_1 & \dots & A_{N_A-1} & A_{N_A} \end{bmatrix} \qquad (16)$$

and $$M_B = \begin{bmatrix} B_1 & B_2 & \dots & B_{N_B} & 0 & 0 & 0 & \dots & 0 \\ 0 & B_1 & B_2 & \dots & B_{N_B} & 0 & 0 & \dots & 0 \\ \vdots & \ddots & \ddots & \ddots & \ddots & \ddots & \ddots & & \vdots \\ 0 & \dots & B_1 & B_2 & \dots & B_{N_B} & \ddots & \ddots & \vdots \\ \vdots & \dots & \ddots & \ddots & \ddots & \ddots & \ddots & \ddots & \vdots \\ 0 & \dots & 0 & 0 & B_1 & B_2 & \dots & B_{N_B} & 0 \\ 0 & \dots & 0 & 0 & 0 & B_1 & \dots & B_{N_B-1} & B_{N_B} \end{bmatrix}. \qquad (17)$$

TABLE 1

Relationship of dimensions of the collected image, the encoding filter mask and the object area contributing to the image.

| Matrix | rows | columns |
|---|---|---|
| Coded-aperture Mask Filter M | $r_F$ | $c_F$ |
| Image on Focal Plane I | $r_I$ | $c_I$ |
| Object area O | $r_O = (r_I + r_F - 1)$ | $c_O = (c_I + c_F - 1)$ |
| Left Toeplitz mask $M_A$ | $r_I$ | $r_O$ |
| Right Toeplitz mask $M_B$ | $c_I$ | $c_O$ |

The difficulty of inversion using Equation (15) is vastly less than for solving Equation (11). The matrices $M_A$ and $M_B$ are not square (except in the trivial case of a single-pinhole mask), so that this is still an ill-posed problem. However, their sizes are much smaller than M" in (11). If the image I has $R_I$ rows and $C_I$ columns, then $M_A$ has $R_I$ rows and $(R_I+N_A-1)$ columns, and $M_B$ has $C_I$ rows and $(C_I+N_B-1)$ columns. The size of the object O is then $R_O$ by $C_O$, where $R_O=(R_I+N_A-1)$ and $C_O=(C_H+N_B-1)$. The matrix inversions thus require an operations count on the order of $$N_{Operations,\,Doubly\text{-}Toeplitz} \propto [(r_O)^3 + (c_O)^3]. \qquad (18)$$

For images of a size on the order of one megapixel, this yields on the order of $2 \times 10^9$ operations, requiring just milliseconds on a teraflops processor. Thus, unlike arbitrarily general masks, doubly-Toeplitz masks can be inverted in a usefully short time.

Those skilled in the art will recognize that $M_A$ and $M_B$ each have the form of a Toeplitz matrix—a matrix in which the elements of each row are identical to the elements in the first row, except for a shift in their column-wise positions, so that each diagonal descending from left to right is constant. The term "doubly" refers to twice the normal extent or two times or in two ways, with reference to the two matrices $M_A$ and $M_B$ that are each in Toeplitz form. In accordance with one aspect of the present invention and in keeping with this inversion time period, the coded image system of the present invention includes a computational time period to decode the encoded image, wherein the computational time period is consistent with speeds faster than 10 million pixels per second per Gigaflops of processing power. The computational time period is less than one second for images that are one hundred megapixels in size when a 10 Gigaflops (1 Gigaflops=1,000,000,000 floating-point operations per second) processor is employed. And further, the computational time period is less than ten milliseconds for images that are one megapixel in size when a 10 Gigaflops processor is employed.

In general, convolutions or correlations (such as image formation) can be expressed as multiplications of the object field with Toeplitz, circulant-Toeplitz, or near-Toeplitz matrices. However, the generalized problem using arbitrary masks may involve such large matrices (on the order of image size×the object size=trillions of elements, for the images the inventors are investigating) that it is in practice intractable. By requiring the masks to have the form specified in Equation (14), the present invention can render the convolution as a pair of much smaller Toeplitz problems.

It will be appreciated that compared to MURAs or generalized masks, the use of doubly-Toeplitz aperture masks reduces the computational burden by orders of magnitude.

Solution Via Regularized Normal Equations

With reference to decoding logic 106, in real imaging systems, there will always be noise arising from effects such as photon counting or read noise, so that the actual inverse problem includes a noise term N, as shown in Equation (15). In addition, there may still be an ill-posed nature of the problem, embodied in the non-square matrices $M_A$ and $M_B$. Both the noise and the ill-posedness require a regularization method via regularization logic 116. Begin by multiplying Equation (15) by the transposes of the mask matrices, obtaining the normal equation:

$$M_A^T I M_B = (M_A^T M_A) O (M_B^T M_B)^T + M_A^T N M_B. \tag{19}$$

The matrix products $(M_A^T M_A)$ and $(M_B^T M_B)$ are square and symmetric, but are not invertible because their determinants are zero, due to degenerate zero eigenvalues. The degree of degeneracy increases with the size of the filter masks—there are $(r_O - r_I)$ zero eigenvalues for $M_A$, and $(c_O - c_I)$ zero eigenvalues for $M_B$. (Compare this case to solving Equation (11) with α=0; which is orders of magnitude more degenerate, having $(r_O c_O - r_I c_I)$ zero eigenvalues.)

To relieve the degeneracies, introduce two regularization parameters $α_A$ and $α_B$, so that:

$$M_A^T I M_B \approx (M_A^T M_A + α_A^2 1_{R_O}) O (M_B^T M_B + α_B^2 1_{C_O})^T + M_A^T N M_B, \tag{20}$$

where $1_{R_O}$ is an identity matrix with dimensions $R_O$, and $1_{C_O}$ is an identity matrix with dimensions $C_O$. Equation (20) now multiplies O by invertible matrices, so that an estimate of O can be derived from the image:

$$O_{Est} = (M_A^T M_A + α_A^2 1_{R_O})^{-1} M_A^T I M_B (M_B^T M_B + α_B^2 1_{C_O})^{-1}. \tag{21}$$

Equation (21) has a form superficially very similar to the noise-regularization employed with the Fourier-transform method of Equation (5). However, it is now also apparent that the regularization parameters are required even if there is no noise, since the matrix inverses would not exist otherwise. This is regularization logic 116 includes a special case of the Tikhonov regularization method used in image de-blurring—the parameters $α_A$ and $α_B$ play the dual roles of regularizing the inversion and controlling the effects of noise.

Figure 3B:
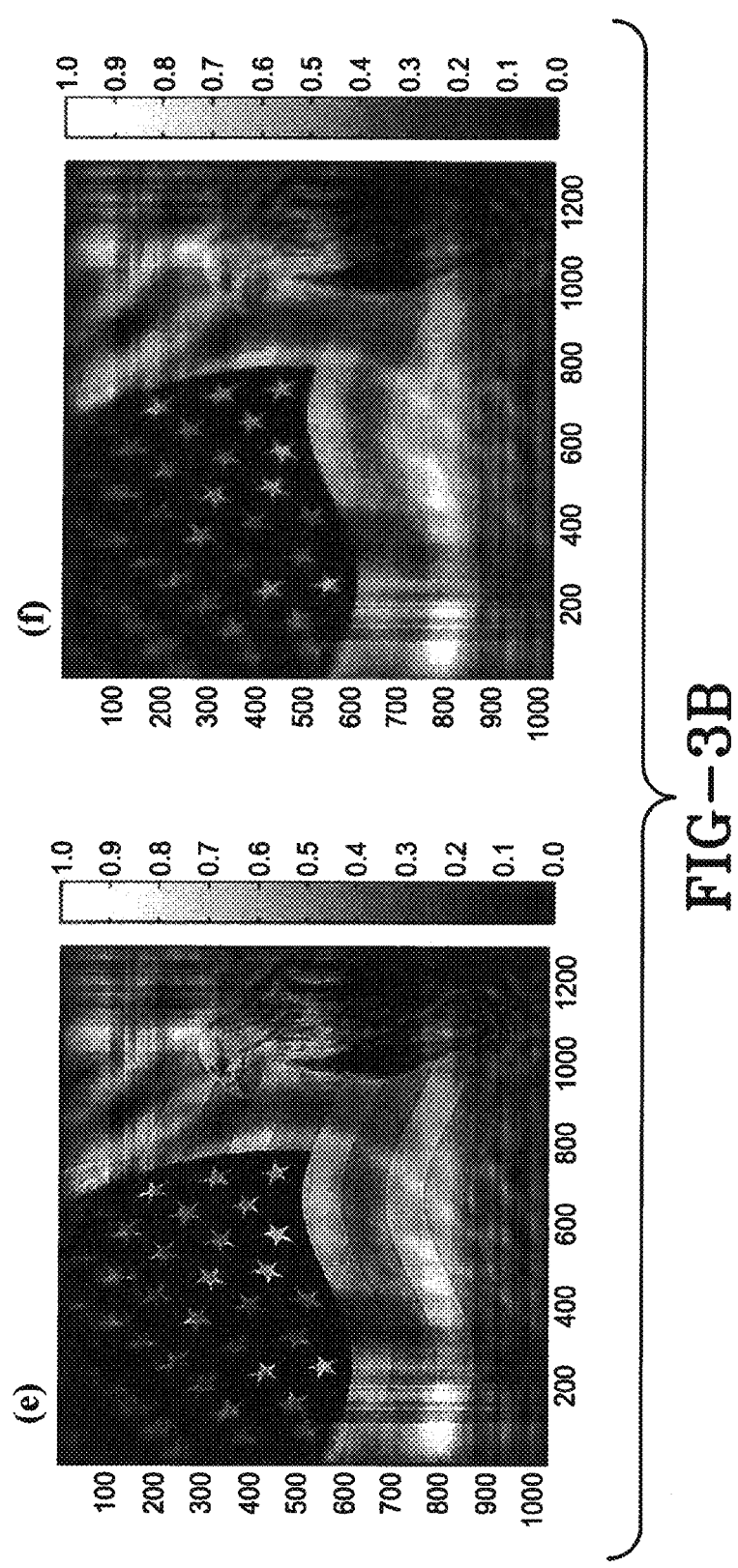
FIG. 3B is a continuation of FIG. 3A wherein panel (e) is the decoded results of panel (c) and panel (f) is the decoded result of panel (d)

An example of the effectiveness of the Tikhonov-Toeplitz encoding and decoding aspect of the present invention 100 is shown in FIG. 3A and FIG. 3B. This is a complex simulated scene with features spanning its edges, yielding severe partial-mask encodings. The encoded images in this case were not reconstructable at all via Fourier methods, even when no noise was present.

Reconstruction logic 118 via Equation (21) successfully reconstructed not only the central portion of the scene (the part with dimensions equal to the image size), but also extended the reconstruction to the entire range sampled by the encoding mask. With noise added to the imagery, the regularization constants had to be increased (from 1E−10 to 1E+02) to suppress the noise. Increasing the Tikhonov parameters cause blurring of fine image features, but still yielded recognizable decodings.

The doubly-Toeplitz encodings enable reconstruction logic 118 to digitally reconstruction of scenes larger than the encoded images. This is due to having complete knowledge of the encoding function, and the fact that there are constrained the degrees of freedom to one dimension instead of two, compressing the unknowns by orders of magnitude.

Successful reconstruction via logic 118 requires that: (1) the imagers 110 have enough dynamic range, that the edges can be "unfolded" from the center without significant loss of information, (2) knowing the encoding functions (either by measurement or by modeling), and (3) constructing Toeplitz masks without zeroes in their spatial-frequency spectra.

Noise Covariance Matrices

A more-generalized regularization is also possible, deriving non-diagonal regularization matrices based on noise covariances, instead of the diagonal matrices $1_{C_O}$ and $1_{R_O}$ in Equation (21), after elimination of the non-noise sources of error and interference. However, some scene-dependent non-noise errors such as stray light may present the majority of the errors.

Normalization of Reconstructed Images

With continued reference to FIG. 3A and FIG. 3B, an image is depicted in panel (a) and the aperture mask 108 programmed with doubly-Toeplitz function M is depicted in panel (b). The reconstructed images in panels (c), (d) in FIG. 3A and panels (e), (f) in FIG. 3B show patterns or "artifacts" at their edges within a distance of one mask width (or height) of the border. The artifacts in encoded images of uniform (all white) scenes, lead the inventors to hypothesize that one can normalize such artifacts out of the reconstructed images.

With reference to decoding logic 106, the normalization can be accomplished normalizing logic 120 by encoding and decoding a uniform all-white object W to create an estimate $W_{Est}$ that includes the errors in image recovery due to the regularized decoding:

$$W_{Est} = [M_A^T M_A + α_A^2 1_{R_O \times R_O}]^{-1} (M_A^T M_A) W (M_B^T M_B) [M_M^T M_B + α_B^2 1_{C_O \times C_O}]^{-1}, \tag{22}$$

then dividing the estimated object $O_{Est}$ by $W_{Est}$ element-by-element to obtain a normalized object estimate $O_{Norm}$:

$$O_{Norm}(i,j) = O_{Est}(i,j)/W_{Est}(i,j) \tag{23}$$

The normalization can also be expressed as multiplication by two normalization matrices $D_A$ and $D_B$:

$$O_{Norm} = D_A O_{Est} D_B^T. \tag{24}$$

This is because the all-white matrix W can be expressed as an outer product of two one-dimensional vectors of constant value, which in turn allows the normalization estimate to be decomposed into an outer product of two 1-dimensional matrices:

$$W_{Est}(i,j) = W_A(i) W_B(i). \tag{25}$$

The normalization matrices $D_A$ and $D_B$ each have identical columns, given by:

$$D_A(i,j) = \tag{26}$$

$$1/W_A(i) = 1 \bigg/ \left\{ \sum_{k=1}^{R_O} [[M_A^T M_A + α_A^2 1_{R_O \times R_O}]^{-1} (M_A^T M_A)](i,k) \right\}$$

$$D_B(i,j) = 1/W_B(i) =$$

$$1 \bigg/ \left\{ \sum_{k=1}^{C_O} [[M_B^T M_B + α_B^2 1_{C_O \times C_O}]^{-1} (M_B^T M_B)](i,k) \right\}.$$

The decoded and normalized object estimate is then:

$$O_{Norm} D_A (M_A^T M_A + α_A^2)^{-1} M_A^T I M_B ((M_B^T M_B + α_B^2)^T)^{-1} D_B^T. \tag{27}$$

The normalization in Equation (27) improves the solution, by removing spurious brightness differences accrued as the coded-aperture mask straddles the edge of the image area.

Iterative Improvement

With continued reference to decoding logic 106, the results from normalizing logic 120 can be further improved with iteration logic 122 by iterating on the solutions derived from Equation (21) or (27). Re-writing Equation (21) in terms of deviations of the estimated object from the true object gives:

$$O = O_{Est}^{\delta} + \{O - [1-\alpha_A^2 S_A]O[1-\alpha_B^2 S_B]\} \quad (28)$$

Where the noise-perturbed object estimate is:

$$O_{Est}^{\delta} = O_{Est} - (S_A M_A^T) N (M_B S_B), \quad (29)$$

where;

$$S_A = (M_A^T M_A + \alpha_A^2)^{-1}, \text{ and} $$

$$S_B = (M_B^T M_B + \alpha_B^2)^{-1}. \quad (30)$$

Equation (28) suggests pursuing a strategy of successively substituting estimates of O into the right-hand side, iterating:

$$O_{(n+1)} = O_{Est}^{\delta} + \{O_{(n)} - [1-\alpha_A^2 S_A]O_{(n)}[1-\alpha_B^2 S_B]\}, \text{ with} \quad (31)$$

$$O_{(0)} = O_{Est}^{\delta}. \quad (32)$$

For well-posed problems, this is essentially the strategy of iterative improvement to reduce numerical round-off errors in inversions. However, for ill-posed problems, Equation (31) will eventually diverge because $(M_A^T M_A)$ and $(M_B^T M_B)$ are not invertible. To see this consider the one-dimensional case: $Y = M_A X$ and the iterative solution:

$$X_{n+1} = X_n + [X_{Est}^{\delta} - [1-\alpha_A^2 S_A]X_n] = X_{Est}^{\delta} + \alpha_A^2 S_A X_n, \text{ with} \quad (33)$$

$$X_{Est}^{\delta} = [1-\alpha_A^2 S_A]Y + S_A M_A^T N. \quad (34)$$

After N iterations, the solution is:

$$X_N = \left[\sum_{k=0}^{N-1} (\alpha_A^2 S_A)^k\right] X_{Est}^{\delta} + (\alpha_A^2 S_A)^N X_0, \quad (35)$$

And as N approaches infinity the series sums so that:

$$X_N \underset{N \to \infty}{=} \left\{ (1 - \alpha_A^2 S_A)^{-1} X_{Est}^{\delta} + (\alpha_A^2 S_A)^{N \to \infty} X_0 \right\} \quad (36)$$

$$= \left\{ \left[1 + \alpha_A^2 (M_A^T M_A)^{-1}\right] X_{Est}^{\delta} + \left[\alpha_A^2 (M_A^T M_A + \alpha_A^2)^{-1}\right]^{N \to \infty} X_0 \right\}$$

For ill-posed problems, the determinant of $(M_A^T M_A)=0$, so that Equation (36) diverges, even in the absence of noise. Thus, the iterations of Equation (31) must be stopped at some finite number via a stopping logic. As the iterations proceed, we can expect the results to initially improve, and then begin to degrade as noise increasingly contaminates the solution. Improving the likelihood of successful iteration depends on:
1) choosing the constants $\alpha_A^2$ and $\alpha_B^2$ so that $(\alpha_A^2 S_A)$ and $(\alpha_B^2 S_B)$ have norms that are small,
2) selecting masks for which it is possible to implement 1), and
3) judicious selection of a criterion for stopping the iterations, truncating the series before noise swamps the solution.

Note that convergence to a finite (though not necessarily correct) solution can be guaranteed if we use a convergence factor $0 < \gamma < 1$ and modify Equation (31) to read:

$$O_{(n+1)} = \gamma^2 O_{Est}^{\delta} + \{O_{(n)} - \gamma^2[1-\alpha_A^2 S_A]O_{(n)}[1-\alpha_B^2 S_B]\} \quad (37)$$

$$= \gamma^2 S_A M_A^T I^{\delta} M_B S_B + \{O_{(n)} - \gamma^2[1-\alpha_A^2 S_A]O_{(n)}[1-\alpha_B^2 S_B]\}$$

$$= O_{(n)} + \gamma^2 \{S_A M_A^T I^{\delta} M_B S_B - [1-\alpha_A^2]O_{(n)}[1-\alpha_B^{\delta} S_B]\},$$

with $O_{(0)} = O_{Est}$.

The analogous 1-dimensional case, Equation (36), then becomes:

$$X_N \underset{N \to \infty}{=} \left\{ \begin{array}{c} (M_A^T M_A + \alpha_A^2)[M_A^T M_A + (1-\gamma)\alpha_A^2]^{-1} X_{Est}^{\delta} + \\ [\gamma^2 \alpha_A^2 (M_A^T M_A + \alpha_A^2)]^{N \to \infty} X_0 \end{array} \right\}, \quad (38)$$

which does converge. In the limit $\gamma \to 1$, Equation (37) approaches Equation (31) in a controlled manner.

The regularization performed by regularization logic 118 is further facilitated by using the normalized object estimate as the starting point. Re-expressing Equation (27) as:

$$O_{Norm} = D_A S_A M_A^T I M_B S_B D_B^T, \quad (39)$$

The iterative solution becomes:

$$O_{(n+1)} = O_{(n)} + D_A S_A M_A^T [I^{\delta} - M_A O_{(n)} M_B^T] M_B S_B D_B, \text{ with} \quad (40)$$

$O_{(0)} = O_{Norm}$, and with the convergence factor included, we have: (41)

$$O_{(n+1)} = O_{(n)} + \gamma^2 D_A S_A M_A^T [I^{\delta} - M^A O_{(n)} M_B^T] M_B S_B D_B. \quad (42)$$

The matrices $D_A$ and $D_B$ enforce normalization as the iterations proceed.

Landweber Iteration

Equation (42) closely resembles the method of Landweber iteration, which iterates via iteration logic 122 using regularization constants $\epsilon_A$ and $\epsilon_B$, so that:

$$O_{(n+1)} = O_{(n)} + M_A^T (\delta_A P_A)[I^{\delta} - M_A O_{(n)} M_B^T](\epsilon_B P_B^T) M_B, \quad (43)$$

Where $P_A$ and $P_B$ are positive-definite symmetric matrices specified to control the convergence. (In classic Landweber iteration, $P_A = P_B = 1$, the identity matrix.)

Comparison of Equation (42) to Equation (43) shows that they are equivalent if we make the identifications:

$$\epsilon_A P_A \Rightarrow \gamma D_A S_A \text{ and } \epsilon_B P_B \Rightarrow \gamma D_B S_B. \quad (44)$$

Thus, Landweber iteration logic 122 with in-process mask normalization proceeds as follows:
1) Set the starting estimate according to Equation (27)

$$O_{(0)} = O_{Est}^{\delta} = P_A M_A^T I^{\delta} M_B P_B \text{ with} \quad (45)$$

$$P_A = D_A S_A \text{ and } P_B = D_B S_B, \quad (46)$$

2) Then iterate using:

$$O_{(n+1)} = O_{(n)} + \epsilon_L^2 P_A M_A^T [I^{\delta} - M_A O_{(n)} M_B^T] M_B P_B. \quad (47)$$

Both Landweber iteration logic 122 and Tikhonov regularization logic 116 seek to solve the ill-posed inverse problem. If the Tikhonov-regularized inversion is performed first, Landweber iteration provides an independently-controlled method for removal of Tikhonov decoding artifacts. The price is that some noise may be re-introduced as the iterations attempt to minimize $[I^\delta - M_A O_{(n)} M_B^T]$, since $I^\delta$ includes noise contributions that were not encoded by the aperture mask.

Stopping Criteria for Iterations

Equation (47) will converge, as long as $0<\delta L^2<2$. However, the convergent solution is not guaranteed to be correct—the results may be noise-dominated unless we stop the iterations of iteration logic 122 at a suitable point via stopping logic. Two general kinds of stopping criteria are possible: a priori criteria, and a posteriori criteria.

A Priori Criteria

If the noise can be characterized separately from the image, then that information can be used to set a priori stopping criteria. Let the residuals after n iterations be donated by $$R_{(n)} = M_A^T [I^\delta - M_A O_{(n)} M_B^T] M_B, \text{ with norm} \quad (48)$$

$$\|r_{(n)}\|^2 = \sum_{i,j} (R_{(n)}(i,j))^2. \quad (49)$$

Let the sum-squared noise be given by:

$$\delta^2 = \sum_{i,j} (\sigma^2(i,j)). \quad (50)$$

Then the iterations should be stopped when:

$$\|r_{(n)}\|^2 < 4\delta^2. \quad (51)$$

This priori stopping criterion is the discrepancy principle originally proposed by Morozov. To apply this criterion, we need an estimate of the random noise in the system. Since we can select coded-aperture masks 108 programmed with M such that the focal planes oversample the mask resolution, one possible choice is to perform local filtering (low-pass or median) on the collected image to obtain a noise-smoothed image $\langle I^\delta \rangle$, then compute $$\sigma^2(i,j) = [M_A^T \langle (I^\delta - \langle I^\delta \rangle)^2 \rangle M_B](i,j), \quad (52)$$

projecting the image noise into the space of the object. This may be effective when the random noise is dominated by pixel-to-pixel variations in the imager electronics (read noise, dark noise, digitizer noise, etc.).

A Posteriori Criteria

The discrepancy principle can be effective when the noise is known and well-characterized. However, there may be additional random noise sources that cannot be determined in advance by characterizing the image-plane array. To address cases in which the noise is not well-known in advance, a posteriori criteria can be implemented with only information from processing a given image. A basic a posteriori procedure is to examine the sequence of residuals from Equation (49), and stop the iterations when they begin to increase:

$$\text{if } \|r_{(n)}\|^2 > \|r_{(n-1)}\|^2, \text{ accept } O_{(n)}. \quad (53)$$

We also tested an alternate stopping criterion limiting the maximum value of the residuals:

$$\text{If } \max_{i,j}(R_{(n+1)}(i,j))^2 > \max_{i,j}(R_{(n)}(i,j))^2, \text{ accept } O_{(n)}. \quad (54)$$

In practice, there was little difference in the results between using Equation (53) and Equation (54), as such they both are in accordance with an aspect of the present invention.

Modified Landweber Iteration

Convergence can be sped up and made more robust by applying the modified Landweber formalism:

$$O_{(n+1)} = O_{(n)} + \epsilon_L^2 D_A S_A M_A^T [I^\delta - M_A O_{(n)} M_B^T] M_B S_B D_B + \alpha_n (O_{(n)} - O_{(0)}), \quad (55)$$

with $$\alpha_n = 1/(4+n). \quad (56).$$

The better the initial estimate $O_{(0)}$, the faster the convergence. In non-limiting model-based evaluations of the present invention, using Equation (55) with Equation (27) as the initial estimate finishes in 1/10 of the iterations required when using Equation (47). All of the Landweber iteration results presented herein are based on Equation (55), with stopping criterion Equation (53).

Simulation of Decoding, Normalization, and Iterative Improvement

Figure 4:
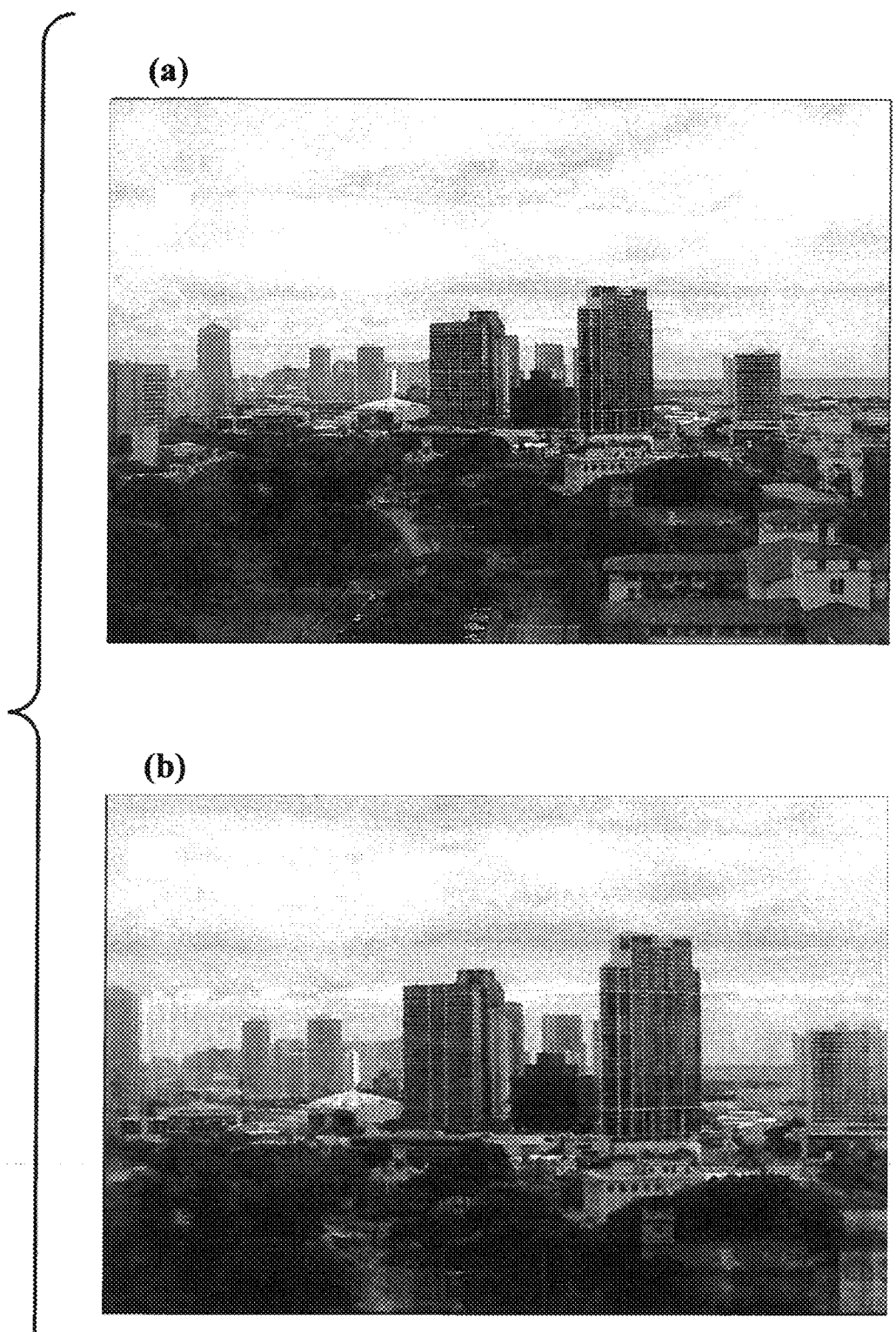
FIG. 4 is depicts in panel (a) a photograph of an urban scene used as input for simulations and depicts in panel (b) a simulated image output from a noiseless, diffraction-free doubly-Toeplitz coded aperture imager.

To illustrate the various steps, a simulated photograph is depicted in panel (a) in FIG. 4. The results of decoding with Equation (21), together with the normalized version from Equation (39) and the final iterated improvement from Equation (55) with stopping criterion Equation (53) are shown in FIG. 4, panel (b) for an ideal noiseless case, with intermediate steps from raw imagery through Landweber iteration illustrated in FIG. 5.

Figure 5:
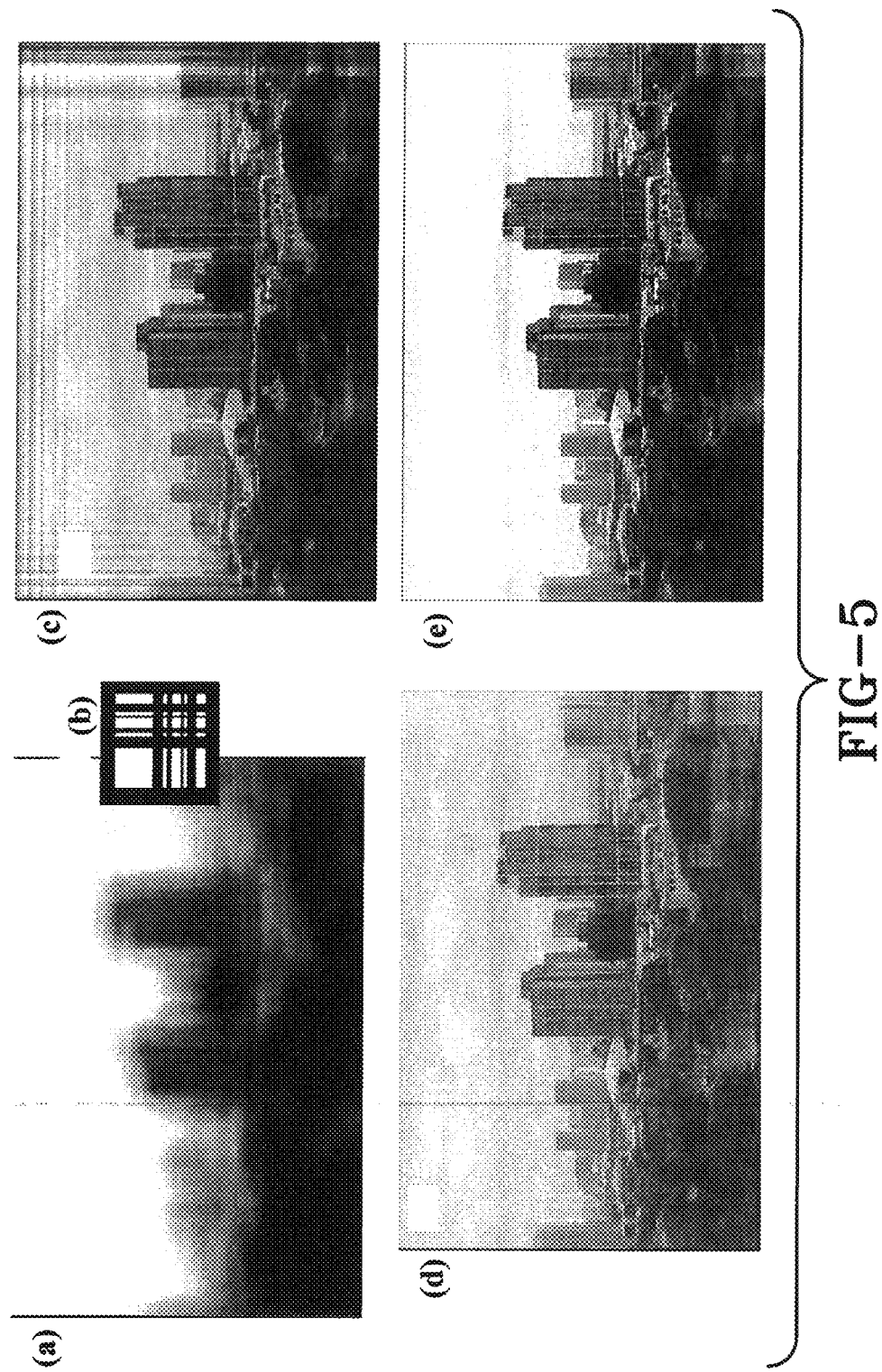
FIG. 5 depicts the simulation of coded-aperture imaging of the scene shown in FIG. 4, wherein panel (a) shows the image acquired through the doubly-Toeplitz mask shown in panel (b), panel (c) shows the initial decoding, panel (d)

FIG. 5 depicts the simulation of coded-aperture imaging of the scene shown in FIG. 4, wherein panel (a) of FIG. 5 shows the image acquired through the doubly-Toeplitz mask 108 shown in panel (b). For clarity, the mask 108 in panel (b) is shown at 3 times its actual size relative to the image. Panel (c) in FIG. 5 depicts the initial decoding applying Equation (21). Because there is no noise and the coded-aperture mask is relatively small, a Tikhonov parameter of $\alpha 2 = \alpha B2 = \alpha A2 = 0.1$ was used—larger masks or added noise would necessitate a larger value of $\alpha 2$. In Panel (c) of FIG. 5 a mask-normalization "linen" pattern or artifact is apparent at the edges of the image. This pattern is caused by the mask-scene correlation function ramping up or down at the image edges. In panel (d) of FIG. 5, the normalized image from Equation (27) is shown. The linen pattern is greatly reduced. The normalized image still shows some residual artifacts due to the need for regularizing the ill-posed decoding problem. Regularization "ghosts" are visible, especially near the edges of the image. Panel (e) in FIG. 5 depicts the reconstructed image after Landweber iteration using Equation (55), wherein the results are improved, with reduced artifacts and higher image contrast. The Landweber iterations used $\epsilon L2 = 0.1$ and converged in 10 iterations.

Exemplary Algorithm Summary

One exemplary non-limiting, method comprises the steps of:
1) encoding an image with a doubly-Toeplitz masks 108 to encode the images;
2) flattening and correcting the raw images for focal-plane noise and in-camera effects such as stray light via filtering logic 114;
3) computing the decoding mask from the diffraction simulation from (65) via regularization logic 116 and reconstruction logic 118;
4) apply Equation (27), using the computed mask, to obtain the initial estimate via normalization logic 120;
5) refining the solution using the modified Landweber iterations, Equation (55) with the stopping criterion (53) via iteration logic 122;
6) if necessary, repeat steps 4) and 5) to optimize the Tikhonov regularization parameters $\alpha_A^2$ and $\alpha_B^2$.

Stated more broadly, an exemplary method of the present invention comprises the steps of: encoding an image through an aperture mask programmed with a doubly-Toeplitz matrix coupled to a camera to create an encoded image; decoding the encoded image to recover a visual representation of an object scene; displaying the recovered object scene in a monitor, wherein the recovered object scene is larger than the encoded image.

The following sections detail work and discoveries leading up to applying these aforementioned method steps to real imagery.

Solution Via Regularized Singular Value Decomposition (SVD)

Equation (15) can also be solved by singular value decomposition, which may be better behaved (with judicious choices of low-eigenvalue cut-offs) than solution via the normal equations. Most of the decodings so far have been performed via the normal equations, using the steps outlined in section 5.5. However, since the Singular Value Decomposition (SVD) method has potential to provide superior performance, it is outlined in this section, to show a roadmap for an alternate method of decoding, normalizing, and iterating to recover images.

SVD decomposes the matrices $M_A$ and $M_B$ into three matrices each such that:

$$M_A = (U_A \Sigma_A V_A^T), \text{ and } M_B = (V_B \Sigma_B U_B^T), \text{ so that:} \quad (57)$$

$$I = (U_A \Sigma_A V_A^T) O (V_B \Sigma_B U_B^T). \quad (58)$$

The matrices UA and UB are composed of orthonomial basis vectors spanning the image space, the vectors VA (also referred to as Vector A) and VB (also referred to as Vector B) are composed of orthonormal vectors spanning the object space, and the vectors A and B are diagonal matrices of eigenvalues. While Equation (58) appears invertible, it actually must also be regularized when the problem is ill-posed and noisy. In this case, Tikhonov regularization can be accomplished by computing diagonal matrices $Z_A$ and $Z_B$ such that:

$$Z_A(i,j) = \delta_{i,j}/(\sigma_A^2(j) + \alpha_A^2) \text{ and} \quad (59)$$

$$Z_B(i,j) = \delta_{i,j}/(\sigma_B^2(j) + \alpha_B^2), \quad (60)$$

where $\sigma_A^2$ and $\sigma_B^2$ are the diagonals of $\Sigma_A$ and $\Sigma_B$. The estimated object is then given by:

$$O_{Est} = V_A Z_A U_A^T I U_B Z_B V_B^T, \text{ and} \quad (61)$$

the normalized version of the SVD solution is:

$$O_{(0)} = O_{Norm,SVD} = D_A V_A Z_A U_A^T I U_B Z_B V_B^T D_B^T,$$

where the elements of the normalization matrices corresponding to Equation (26) are:

$$D_A(i,j) = 1/W_A(i) = 1 / \left\{ \sum_{k=1}^{R_O} (V_A Z_A \Sigma_A V_A^T)(i,k) \right\}, \text{ and} \quad (62)$$

$$D_B(i,j) = 1/W_B(i) = 1 / \left\{ \sum_{k=1}^{C_O} (V_B Z_B \Sigma_B V_B^T)(i,k) \right\}.$$

The derivation of iterative improvement is the same as the normal equations, yielding:

$$O_{(n+1)} = O_{(n)} + \epsilon_L^2 D_A V_A Z_A U_A^T [I^S - M_A O_{(n)} M_B^T] U_B Z_B \cdot V_B^T D_B^T + \alpha_n (O_{(n)} - O_{(0)}). \quad (63)$$

The current inversions and iterations rely on solving the normal Equation (20), via normalizations (39), and iterations (47). Future application of the SVD methodology may apply to problems to which improvements beyond the normal equations are required.

Toeplitz Processing and Temporal Fluttering

If an imager is moving with a velocity vector aligned with one of the imaging axes, the machinery of Toeplitz decoding can be applied directly, with little modification. In the more general case of an arbitrary direction of motion, the image will need to be rotated into a synthetic coordinate system aligned with the motion direction prior to decoding.

Diffraction Simulations: Effects on Doubly-Toeplitz Masks

Having identified an approach to reduce the impact of partial-mask encodings, aspects of the present invention set out to refine simulation codes to better model the system performance, in order to: verify that the doubly-Toeplitz property was preserved in diffracted masks, verify the requirements for laboratory-collected masks to be valid, quickly evaluate candidate aperture masks, and provide a means of synthesizing decoding matrices when collected masks are not available.

To this end, aspects of the present invention added diffraction to the simulation code. This is particularly straightforward for a collection of identical rectangular apertures placed at points on a rectangular-grid SLM.

Let $I_O$ and $I_P$ denote intensity fields at the object and image planes, respectively, and let $E_O$ denote the complex optical field at the object plane. The diffracted intensity in a pixel at location (i,j) on the image plane is:

$$I_P(i,j) \approx \sum_{k,l} |Q_X(i+k)|^2 I_0(k,l) |Q_Y(l+j)|^2 + \quad (64)$$

$$\sum_{k,l} \sum_{l' \neq l} Q_X(i+k) Q_Y^T(l+j) \langle E_0(k,l) E_0^*(k,l') \rangle Q_X^*(i+k) Q_Y^{T*}(l'+j) +$$

$$\sum_{k,l} \sum_{k' \neq k} Q_X(i+k) Q_Y^T(l+j) \langle E_0(k,l) E_0^*(k',l) \rangle Q_X^*(i+k') Q_Y^{T*}(l+j) +$$

$$\sum_{k,l} \sum_{k' \neq k, l' \neq l} Q_X(i+k) Q_Y^T(l+j)$$

$$\langle E_0(k,l) E_0^*(k',l') \rangle Q_X^*(i+k') Q_Y^{T*}(l'+j)$$

The angular brackets < > in Equation (64) indicate the ensample average over quantities therein. Unless k=k' and l=l', the optical fields E₀ (k,l) and E₀ (k',l') are statistically uncorrelated, so that the ensemble averages of their products vanish, simplifying Equation (64) to produce Equation (65):

$$I_P(i,j) \approx \sum_{k,l} |Q_X(i+k)|^2 I_O(k,l) |Q_Y^T(l+j)|^2, \text{ where} \quad (64)$$

$$Q_X(k_x) = \sum_{j_X} A(j_X) \exp\left\{i\frac{2\pi}{\lambda} j_X p_X \left[k_x \frac{\Delta x_P}{f_P} - \frac{j_X p_X}{2}\left(\frac{1}{R} + \frac{1}{f_P}\right)\right]\right\} \times \quad (65)$$

$$\operatorname{sinc}\left[\frac{\pi}{\lambda} a_X \left[k_x \frac{\Delta x_P}{f_P} - j_X p_X \left(\frac{1}{R} + \frac{1}{f_P}\right)\right]\right], \text{ and}$$

$$Q_Y(k_y) = \quad (66)$$

$$\sum_{j_Y} B(j_Y) \exp\left\{i\frac{2\pi}{\lambda} j_Y p_Y \left[k_y \frac{\Delta y_P}{f_P} - \frac{j_Y p_Y}{2}\left(\frac{1}{R} + \frac{1}{f_P}\right)\right]\right\} \times \operatorname{sinc}\left[\frac{\pi}{\lambda} a_Y\right].$$

The parameters in Equations (64) through (67) are:
($a_X$, $a_Y$)=Aperture opening sizes ($p_X$, $p_Y$)=Aperture pitch, >($a_X$, $a_Y$)($\Delta x_P$, $\Delta y_P$)=Image-plane pixel pitch
A, B=vectors of weights of mask elements in the x and y directions
R=Range from aperture mask to object plane
$f_P$=range from aperture mask to image plane
$\lambda$=wavelength of light.
Examination of Equation (65) shows that, if the raw aperture mask is an outer product of two one-dimensional vectors A and B, then the effects of the diffracted mask can still be expressed as an operation of a pair of Toeplitz matrices. Thus, a doubly-Toeplitz aperture mask 108 will yield a doubly-Toeplitz encoding, even when there is significant diffraction.

Those skilled in the art will see by inspecting Equation (65) that the image encoding described by Equation (65) is decomposable into A and B vectors which can be used to synthesize decoding masks. It will thus be appreciated that doubly-Toeplitz aperture masks remain doubly-Toeplitz when diffracted. Further, if the surface reflecting the light is microscopically rough, the illumination can be coherent or laser-like, and Equation (65) would still hold true.

Diffraction Model Verification

To verify that aspects of the present invention are correctly simulating the diffraction, a series of experiments were conducted. The experiments included a collected image a synthetic image of a point source through a single large square aperture. The experiments also included a collected image and a synthetic image through a similarly-sized aperture created with SLM. Agreement between lab data and the diffraction model is high. Within the precision with which one can measure the experimental parameters, the agreement between model and data is excellent. Thus, aspects of the present invention include a simulation tool which one can use to evaluate candidate aperture masks in silico. The agreement between model and data also gives us confidence that we can use lab-collected masks as decoding filters.

Diffracted masks were also modeled, and compared to "collected masks"—images of a point-source viewed through the spatial-coding masks. It was verified that the collected masks decompose into outer products of diffracted 1-dimensional functions, in accord with Equation (64). A diffracted 1-dimensional mask is compared to the un-diffracted version in FIG. 6. This figure also illustrates a drawback to using MURA masks: diffraction alters the actual mask pattern and makes it non-binary, destroying the self-inversion in Equation (3).

Other Effects Modeled

In addition to diffraction, the simulation model includes random noise and non-diffraction blur, as well as light leakage through the "off" pixels of the SLM. This light leakage required the diffraction simulator, and has a significant impact on the image contrast, since even a small leakage of power implies a much larger optical-field leakage, since the power is proportional to the square of the field. For example, a 1% power leakage implies an optical field variation of 10%.

Random noise is generated primarily by photon-counting (shot noise), thermal dark noise, and pixel read/reset noise. Aspects of the present invention are currently treating this as Gaussian-distributed with an empirically-determined standard deviation $\sigma_{noise}$. For the light levels at which our system is currently being tested, $\sigma_{noise}$ is approximately 0.23% of the mean signal level.

Non-diffraction blur can arise from inhomogeneities in the liquid-crystal material of the SLM pixels, and from portions of the pixel circuitry which are not 100% opaque. We currently model these scattering sources with a Gaussian point-spread function with width $\sigma_{scattering}$. In our present to date, the blur seems to subtend only a few focal-plane pixels.

Both $\sigma_{noise}$ and $\sigma_{scattering}$ can be estimated by fitting the model to laboratory-collected data, and further refined (if needed) via parameter optimization algorithms.

Mask Selection

In simulated imagery, doubly-Toeplitz mask selection is a key determinant of the quality of images recovered from coded-aperture cameras. In general, the larger the mask, the more degenerate the ill-posed inversion and the greater the decoding artifacts. On the other hand, the smaller the mask, the lower the light-gathering ability and the longer an exposure time is required. Thus, the masks chosen need to balance light gathering with decoding quality. Criteria we have considered include:
1) Making the open area as large as possible to gather light. For example, to achieve a 50% open area, each vector A and B need to have at least 70.7% throughput.
2) Minimizing the loss of information within the Nyquist frequency of the image plane array
3) Minimizing aliasing of spatial frequencies above the Nyquist frequency
4) Minimizing spatial-frequency-dependent phase shifts that can cause "ghost" images in reconstruction.
5) Maximize effective dynamic range of reconstructed images
6) Robustness versus diffraction and scattering blur.

While the foregoing criteria are highly recommended, they do not appear to be sufficient to either uniquely specify aperture masks or insure high-quality decodings. Currently, mask selection involves searching through a list of random candidate masks, then applying thresholds on the Fourier transforms to select those which might have desirable image-formation properties, followed by testing with simulated encoding and decoding to quantify mask quality. The search space is enormous. For example, a 100-element mask vector has 2^100 possible binary combinations, the vast majority of which will not be useful.

There are additional strategies for optimizing masks. So far, some preferred non-limited exemplary masks identified are shown in FIG. 7. FIG. depicts a plurality of doubly-Toeplitz coded-aperture masks, and the dimensions are given in terms of SLM elements on a 36-micron pitch, such that, the "01" mask of panel (a) is an outer product of two identical 1-dimensional vectors, and the other masks are simply scaled up from the "01" mask, the "02" mask of panel (b) measures 62×36 microns=2.2 mm on each side, the "04" mask of panel (c) measures 124×36 microns=4.5 mm on each side, and the "08" masks of panel (d) measures 248×36 microns=8.9 mm on each side. The 32-element 1-dimensional mask was adapted from the temporal processing results of Agrawal et al. A few other masks that meet the 70%—throughput criterion are compared in terms of their fast Fourier transform algorithm (FFTs) and their encoding/decoding performance in FIG. 8A and FIG. 8B.

FIG. 8A and FIG. 8B depict a comparison of two candidate masks. In FIG. 8A, panel (a) and panel (b) are exemplary masks that meet a 70%—throughput criterion, panel (c) is the natural logarithm of the FFT of the mask-generating sequence of panel (a), and panel (d) is the natural logarithm of the FFT of the mask-generating sequence of panel (b). FIG. 8B is a continuation of the comparison made in FIG. 8A wherein panel (e) depicts the decode image obtained through the mask in panel (a) and panel (f) depicts the decoded image obtained through the mask in panel (b). The edge artifacts resemble the mask pattern, and higher-resolution masks seem to be more susceptible to noise.

From these and other test cases there may be more optimization to be done in mask selection as only a tiny fraction of the possible masks have been investigated. There appears to be a tradeoff between noise mitigation and spatial frequency preservation having multiple small-scale features seems to add decoding ghosts. There also is a trade-off for large features—the larger the largest mask feature, the more the effective dynamic range is compressed for low-spatial-frequency features. The masks may have to be optimized for the bit-depth of the image plane, and for the degree of dynamic range extension that can be derived by oversampling the encoded image.

To improve mask selection, aspects of the present invention have developed an automated image-quality scoring program which can be used with the coded-aperture simulator to quantify the performance of masks and algorithms. The next step is to develop a mask-candidate-selection algorithm that can efficiently narrow the search space of all possible masks, so that only the most likely candidates are fed into the automated assessment algorithm. The final assessments of masks will be done via imaging real scenes and using human-in-the loop scoring.

Laboratory Characterizations of SLM and Image-Plane

In the course of developing the diffraction model for coded-aperture imaging, there should be a better knowledge of and control over the spectral and angular dependencies of the SLM devices. In particular, Equation (65) requires knowledge of the spectral throughputs and responsivities.

As depicted in FIG. 9, a lab experiment was created to gain deeper understanding on how the SLM 140 polarizer responses were affecting imaging and decoding for lensless imager with mask 108 (FIG. 1) from a halogen lamp 143 measured by spectrometer 145. The setup is shown FIG. 9, with results presented in FIG. 10 and FIG. 11.

FIG. 10 presents the results of the % of light transmission of white and black SLM 140 pixels at normal incidence (0°; vertical in FIG. 9). The vertical axis represents the transmission percentage and the horizontal axis represents the wavelengths.

Angular measurements 142 show that as angle moves away from normal, the light leakage through the black pixels increase, and the throughput of the white pixels decrease. The contrast ratio of black/white throughputs is referred to as the contrast ratio and is plotted in FIG. 11. Contrast ratio 144a is associated with angle measurement 142 of 0°. Contrast ratio 144b is associated with angle measurement 142 of 10°. Contrast ratio 144c is associated with angle measurement 142 of 20°. Contrast ratio 144d is associated with angle measurement 142 of 30°. Contrast ration 144e is associated with angle measurement 142 of 40°.

In FIG. 11, over the operating region, there are significant variations in the ratio of "off" to "on" pixels. This means that the apparent mask contrast varies for directions away from normal incidence. This contributes to the light leakage which can reduce image contrast.

Image-Plane Defects, "Dead" Pixels, and Other Camera Artifacts

A negative impact on coded-aperture reconstruction quality accrued from defects on the image plane, including dead pixels and debris or schmutz covering pixels. Isolated single-point defects are straightforward to model, so we developed and tested image-healing algorithms that effectively countered them, as detailed below.

Even with defect-healing algorithms, aspects of the present invention note that the decoding performance real SLM data was not as good as the modeled performance, especially for larger masks. One aspect of the present invention eliminated focal plane noise, diffraction, and other effects via modeling and experiment. The major discrepancies were traced to un-modeled internal reflections inside the camera, probably due to reflections from the micro-lens array projected on the inside of the inner surface of the camera window.

An example of an image showing numerous reflections is shown in FIG. 12. Panel (a) in FIG. 12 depicts image flat acquired by looking into an integrating sphere through the SLM, with the "Ag08" mask pattern commanded. This mask 108 subtends about 248 SLM elements, or about 1200 focal-plane pixels. Panel (b) the flat band-passed to remove the low-spatial-frequency components of the flat. Many small apparent defects in the flat are visible. The inset identified in panel (c) shows an expanded view of a portion of the band-passed flat, showing several images of the aperture (circled). These reflections appear at the same locations in both the flats acquired by looking into an integrating sphere and in the images of extended scenes, though with scene-dependent amplitudes, requiring additional image-processing steps.

Because the reflections were not encoded by the mask, they cannot be decoded, and attempting to decode them yields image artifacts which resemble those produced by defects on the image plane.

To deal with the reflections in the data collected, one aspect of the present invention has modified focal-plane-defect-healing algorithms to knock out the reflections. This requires acquiring camera "flat' images with the spatial light modulator in place and commanded to provide an aperture of the dimensions of the mask to be used. Acquiring the flat in that manner allows the locations of the stray reflections to be mapped and stored for use in the defect-healing algorithms. Mitigating the stray-light artifacts in this way is a short-term fix, since it possesses the drawback of removing larger areas as the mask grows, which introduces a new set of errors and artifacts.

Stray-light artifacts also appear in the collected-mask images. These are images of a point source collected with the coded-aperture mask in place. Normally, the point-source images would provide decoding masks which automatically include scattering and diffraction. Unfortunately, the stray-light contaminated collected masks also required image healing, and provided inferior performance to modeled masks. Thus, we used simulations to create model masks in which we included diffraction, multiple-scattering blur and light leakage.

The modeled masks were used to decode all of the real imagery shown in this report. The permanent fix will be introducing camera hardware modifications to reduce or eliminate the stray-light reflections.

Bad Pixel Correction and Image-Healing Algorithms

One issue faced when decoding real data is that of degraded data, such as produced by bad pixels, defects in the optics, etc. In a classical imaging system, these will manifest as dark or bright pixels, or small, sometimes blurry, dark spots in the focused imaged. In decoded images, the information content of a single bad pixel or a dark spot on the image will be redistributed through the decoded image, resulting in mask-shaped artifacts in the final image. In order to avoid these, we first conduct a "repair" of the collected raw image.

One aspect of the present invention implemented a two-step repair process. First, identify bad pixels as part of a radiometric calibration. Then, collect and average a series of 100 image frames using the same exposure times as for actual imaging, but with the aperture fully occluded, to collect a "dark" file that indicates dark current biases. This is followed by averaging 100 frames collected viewing into an integrating sphere to collect a "flat" file, which indicates non-uniformity of response across the focal plane. The choice of 100 frames for the statistical averaging is desired by not required. In general, longer series yield more-precise characterizations of defects, while shorter series minimize the effects of time-dependent drifts in response. An system designer skilled in the art would select the optimal number of frames for a particular application. These flat and the dark files are used to identify bad pixels—those having responses significantly different from their neighbors at a given incident light level. These include "hot" (abnormally bright), "saturated" (stuck at maximum digital count, even in the absence of incident light), "cold" (abnormally dark), or "dead" (not responding at all to incident light.) Hot and saturated pixels are identified from dark images—images collected with the aperture occluded—by identifying all pixels having a light-free output value greater than some threshold value. Here, use a threshold of twice the local neighbor median for that pixel, using a 5×5 pixel neighborhood centered on each pixel. Cold and dead pixels, as well as potential additional hot pixels, are identified from "flat" imagery; any pixel for which the value is outside an acceptable range from the local neighborhood median value is flagged as bad. A map of bad pixels is generated to include all pixels flagged above.

The bad-pixel map is generated once from calibration data, then applied to each collected raw image to mitigate image defects. Most defects are single-pixel defects; values for these pixels are replaced with the mean values from the four adjacent neighbors. The size and shape of the neighborhood used for healing single-pixel defects is flexible. Four neighbors may be expanded to six, eight, ten or more. For any contiguous cluster of bad pixels, values are linearly interpolated across the bad pixel region using the nearest adjacent good pixel values for that image. Values are interpolated across the shorter dimension of the bad cluster first, this repeated as necessary until the defective cluster is filled in with interpolated replacement values. This simple approach relies on the assumption that the correct raw image (encoded) content is generally smoothly varying, and defects are typically singleton pixels. Yet still, other healing algorithms are entirely possible, the aforementioned algorithm is offered by way of example.

Another aspect of the present invention have found that, in addition to bad pixels on the imaging focal plane, other image defects (e.g. due to dirt or internal reflections cause similar decoding artifacts). These defects tend to involve small, contiguous clusters of pixels, but have lower contrast than bad pixel defects. These are mitigated by making a second "bad pixel" map after the initial repair, but using much lower tolerances for the deviation from local neighborhood medians values and a larger neighborhood. As before, the defects are mapped, and repaired using linear interpolation across the shortest dimension of the defect.

Random-Noise Mitigation

Because random pixel-to-pixel variations caused by dark noise, fixed-pattern noise, and bad pixels are not encoded by the mask, they must be removed via filtering logic 114 before decoding is performed. Median filtering the raw image, followed by bad-pixel removal, reduced the noise effects. However, the effectiveness of median filtering was limited by the stray light contamination. Until the stray-light problem is solved, the inventors accomplish further mitigation of random noise by averaging multiple frames of imagery.

FIG. 13 depicts the effectiveness, comparing 1, 10, and 20-frame averages of the same scene. The averaging depicted in FIG. 13 is done on the raw images, before any flattening, correction, or decoding was applied. Panel (a) shows a single frame, panel (b) shows ten averaged frames, and panel (c) shows twenty averaged frames.

Brief Summary of Effects of Assessed

Via modeling, simulation and experimentation, aspects of the present invention assessed the various sources of errors in coded-aperture imaging, as outlined in Table 2. The effect often cited (by other researchers) as an impediment—diffraction—proved to be a minor problem when doubly-Toeplitz masks are used for the coded apertures. The effects of diffraction are primarily to (a) increase the ill-posed degeneracy by requiring larger decoding matrices in Equation (27), and (b) complicate mask selection by invalidating the assumption that the masks are binary. The major effects turned out to be due to device characteristics: defects and non-uniformity of the image plane array, and light leakage through the "off" elements of the SLM, and the consequent reflections of that light inside the camera, especially from the micro-lenses covering each image-array pixel.

TABLE 2

Summary of Effects of Modeled Error Sources

| Name | Impact | Manifestation | Mitigation |
|---|---|---|---|
| Diffraction | Minor | Adds blur | Increase size of decoding mask to capture diffraction patterns |
| SLM-element throughput & scattering variations | Minor | Adds blur | Add blur term to decoding mask |
| Image-Plane Random Noise | Moderate | Reduced contrast in decoded images | Median filter the raw image before decoding |
| Spectral throughput of SLM | Moderate | Increased leakage through "off" pixels outside nominal band | 1. Add a band-pass filter to the optics<br>2. Compute diffracted mask over multiple wavelengths in band |
| Angular Dependence of SLM Throughput | Moderate | Decoded scenes how an intensity roll-off with angle | Post-decoding image flattening. This is impeded by the presence of stray light inside the camera. |
| Toeplitz Mask Selection | Moderate | Adds image "ghosts" and artifacts at edges of decoded images. | 1. Use the smallest mask consistent with the lighting conditions.<br>2. Average multiple images with different mask orientations<br>3. Develop improved mask-search methods to identify optimal masks. |
| Image-Plane Defects (bad pixels, hot pixels, cold pixels) | Major | "checkerboard" artifacts in decoded image | 1. Flatten the image to reduce pixel-to-pixel response variations.<br>2. Filter out & "heal" bad pixels in raw image before decoding |
| In-band Light Leakage Stray Light and Reflections Inside Camera | Major | Low contrast decodings with mask-imprint artifacts | 1. Short-term: Normalize with "SLM flats" and apply aggressive defect-healing algorithms.<br>2. Long-term: implement hardware mods to reduce stray light and reduce residual throughput of "off" SLM elements. |

Parameter Optimization

In the regularized doubly-Toeplitz inversions described above, certain parameters must be estimated properly to obtain the highest-quality scene reconstruction via optimization logic which may be a part of the reconstruction logic 118. For example, the Tikhonov regularization constant $\alpha$ helps reduce noise in the reconstruction, but setting this value too high causes undue blurring of the reconstructed scene. While a value for a can be chosen using visual assessment of decoded image quality, the selection process can be automated using a numerical minimization routine.

To find the optimum $\alpha$, first select a starting value $\alpha_0$, and provide this to the minimization routine along with the decoding function, the original scene (which serves as the "ideal" reconstruction) and the synthetically-encoded image. The routine decodes the scene using the initial regularization value $\alpha_0$, and then finds the pixel-wise correlation coefficient r between the recovered scene intensities and the ideal scene intensities. Using correlation (as opposed to a simple sum of squares) makes this invariant to any intensity scale or offset differences that might be introduced by the particular decoding process. This general methodology can also be applied to refine other parameters, such as blur due to scattering.

This parameter optimization is also generalizable to the temporal and fused 2D spatial-temporal coded aperture imaging. Temporal coded-aperture imaging is also an ill-posed problem amenable via Tikhonov-regularized inversion of a spatial transform of the temporal transfer function. The temporal regularization constant $\alpha_{Temporal}$ for this inversion will be distinct from the spatial values, and can be separately optimized to optimize decodings. As with the spatial decodings, the optimal value of $\alpha_{Temporal}$ will depend on the noise and on the temporal code. Unlike the spatial problem, it will also depend on the speed acceleration of the imager, making an automated approach for parameter optimization even more valuable.

Finally, it is likely that an optimal solution of the full problem will require and additional step to refine the Tikhonov parameters. For example, it is conceivable that the spatial regularization which works best for static cases may not be the same as the spatial regularization for the joint spatial-temporal decoding.

Encoding and Decoding Real Data

These real data images were simulated with the large "08" mask identified in panel (d) of FIG. 7.

The development, simulation, and in-laboratory testing refined the methods of coding and decoding improved the camera performance and made it possible to image extended outdoor scenes in natural light. These images were used to further refine and de-bug the processing.

In accordance with one aspect of the present invention 100, one exemplary experimental setup is shown in FIG. 14. The camera 110 was on the 12th floor of the First Hawaiian building in Honolulu, Hi., approximately 45 meters above the ground, and looking west towards the city skyline. The camera 110 includes programmable SLM aperture mask 108 operatively coupled thereto including a doubly-Toeplitz matrix programmed thereon. The SLM aperture mask 108 programmed with the doubly-Toeplitz matrix is controlled by a SLM pattern command computer 107. In addition to the programmable SLM mask 108, the camera 110 had a green-bandpass filter to reject wavelengths that are not adequately blocked by the "off" pixels of the SLM, as illustrated in FIG. 10. Wherein, for normal incidence, black pixels "leak" light at about 1.4% of white pixels over the range 500 nm-650 nm. In the deep blue (<475 nm) or deep red (>750 nm) ranges, the on/off contrast is lower. It is recommended that a filter is used that limits the incoming light to 450 nm<$\lambda$<650 nm. The decoding logic 106 is shown self-contained within a computer in accordance with the definition of "logic" as defined above.

The mathematical methods outlined in previous sections were realized in computer code (i.e. decoding logic 106), with the non-limiting steps outlined in FIG. 16. For example a method 1600 may include the step of encoding an image through an aperture mask programmed with a doubly-Toeplitz matrix, shown at 1602. Then, there is correcting the encoded image through flattening and darkness reduction, shown at 1604. Then there is, removing bad pixels, shown at 1606. Next there is, filtering the encoded image to denoise the encoded image, shown at 1608. Then there is, decoding the encoded image, shown at 1610. And then, normalizing the decoded image, shown at 1612. The de-noising step can be either single-frame de-noising, or de-noising by adding multiple raw images before decoding. Since the stray-light interference limits currently limits the effectiveness of single-frame de-noising, FIG. 15 used a 20-frame average, with the raw images averaged together before application of flat, dark, and defect corrections.

Comparison to Equivalent Pinhole Apertures

With primary reference to FIG. 17, inasmuch as coded-aperture imaging is based on the principle of collecting overlapping images from many pinholes, it is fair to ask how coded-aperture images compare to pinhole-camera images. To insure that the apertures had the same light-gathering capability, aspects of the present invention used pinholes with the same un-obstructed area as the coded-aperture mask. For example, the small "02" coded-aperture masks spanned 62 SLM elements in each direction, with 43 "on" elements. Thus, the inventors compared a 43×43 pinhole camera (a square mask with all elements turned on in a 43×43 area) to the 02 coded aperture. The raw unprocessed images for each are of similar (blurry and unrecognizable) quality, as shown in FIG. 17. In FIG. 17, both images in panel (a) and panel (b), doubly-Toeplitz processing was applied using synthetic masks which included diffraction and light leakage. The images were also normalized, then Landweber-iterated until convergence. Compared to the pinhole-camera image (panel (a) in FIG. 18), the coded aperture image provides superior resolution (panel (b) in FIG. 18).

The same image processing was applied to both images, using model-generated diffracted masks and following the method steps shown in FIG. 16. The results of the processing (FIG. 18) show recovery of recognizable imagery, with the coded-aperture showing superior detail and quality.

To test the dependence on aperture size, aspects of the present invention also collected data using a large coded-aperture, the "08" version, spanning 248×248 SLM elements. In this case, the pinhole with equal collecting area spanned 172×172 elements. The raw data are shown in FIG. 19, and the decoded images are shown in FIG. 20. The difference in recovered image quality between pinhole images (panel (a) in FIG. 20) and coded apertures (panel (b) in FIG. 20) is greater at the larger aperture sizes.

Pinhole Mask Versus Coded Aperture Conclusions

The coded-aperture processing developed of the present invention can be leveraged to greatly improve the images output from pinhole cameras. In particular, it is possible to mitigate diffraction and geometric blur to recover images from raw data that would be otherwise unrecognizable.

Even with advanced processing applied to pinhole images, coded-apertures still provide superior image quality. The performance difference between pinhole cameras and coded-aperture imagers can be traced to two primary causes:

(1) The spatial-frequency content of the image is less compromised by a coded-aperture containing elements of several sizes than by a single large uniform aperture. The coded aperture better preserves high spatial frequencies.

(2) At low spatial frequencies, the dynamic range of the recovered images falls as the size of the largest contiguous area in the aperture grows. For example, the small mask spanning 62 SLM elements has a largest opening of 26 elements, while the equivalent-area rectangular mask has a single opening of 43 elements. This leads to a factor of 43/26=1.65×advantage in dynamic range for the coded aperture.

Thus, for a given light-gathering area, a coded aperture mask provides better image resolution than a rectangular "pinhole" aperture. Also, as the overall aperture size increases, coded-aperture imagers maintain resolution and image quality better than do pinhole cameras.

Image Stacking

Theoretical investigations showed that the regularization artifacts noted in FIG. 5 differ from mask to mask, while the real objects in the scene are coherent. Thus, improved reconstruction could use multiple images collected with rotated versions of the encoding mask. The idea is that artifacts that have a directional dependency (related to the orientation of the mask), or that are specific to a particular mask, could be reduced by using multiple mask orientations or multiple masks. If the masks remain centered at the same pixel, and the camera is stationary, then the resulting decoded images will align to sub-pixel accuracy.

Aspects of the present invention have conducted an initial test of this approach using four, ninety-degree rotations of the same basic mask. The four images were decoded separately, and stacked to provide an improved image result. (Alternatively, a completely different doubly-Toeplitz mask could be applied to each image.) Future image-combining algorithms could use a slightly more sophisticated, approach, discarding outlier values. When the camera or mask moves between subsequent frames, a simple similarity transform (translation plus rotation) would be capable of achieving the necessary sub-pixel registration accuracy needed for stacking, given that the time between frames is small enough to prevent major perspective changes.

Results from simply averaging the four resulting decoded images are compared with single-mask imagery in FIG. 21, and compared to the "truth" image in FIG. 22. FIG. 21 shows final results of processing real imagery with multi-mask (four 90-degree rotations of the "02" mask) in panel (a) versus using a single mask in panel (b), showing reduction of magnitude of some decoding "ghost" artifacts.

FIG. 22 shows in top panel (a) a decoded scene shown of FIG. 21 and at the bottom panel (b) a reference photo of the scene acquired with a conventional camera (note: the clouds are different because the images were acquired at different times).

In accordance with one exemplary aspect of the present invention, coded image system 100 may permit computed imaging to be completely done without the need for a traditional camera lenses.

In a non-limiting conclusion, and briefly by the way of non-limiting example, those skilled in the art will appreciate that aspects of the present invention, amongst other things, have:
  determined that the generalized mask problem is computationally very difficult, perhaps making the use of MURA masks impractical for extended-scene coded aperture imaging;
  identified a new class of doubly-Toeplitz coded-aperture masks 108 that make the problem of partial mask encoding much more tractable, enabling efficient algorithmic methods for inverting the system transfer function;
  developed multiple regularized de-coding approaches for doubly-Toeplitz masks 108 and improved the decoding quality so that images the inventors obtain with a programmable spatial-light modulator function M mask 108 are of better quality than those the inventors were obtaining with non-programmable lithographic masks;
  developed a simulation program which includes realistic diffraction effects, and verified it has sufficient fidelity to the laboratory data that may be uses to guide mask selection and algorithm optimization, the simulation also includes system PSF, noise, and scattering;
  investigated how the optical properties of transmissive SLMs affect or limit the effectiveness of coded-aperture imaging, and developed mitigation methods;
  applied the doubly-Toeplitz encoding and decoding methodologies to programmable coded-aperture imagers and successfully decoded imagery from extended outdoor scenes in natural light; and
  while the present invention has been described in connection with the preferred embodiments of the various figures, it is to be understood that other similar embodiments may be used or modifications and additions may be made to the described embodiment for performing the same function of the present invention without deviating there from.

For example, doubly-Toeplitz coded apertures may be realized, with programmable or fixed non-programmable masks fabricated from a variety of materials, and applied for radiation of any wavelength, from gamma rays to radio waves. Therefore, the present invention should not be limited to any single embodiment, but rather construed in breadth and scope in accordance with the recitation of the appended claims. Additionally, the term "programmable" also includes a sequence of selectable fixed-pattern apertures, each of the doubly-Toeplitz type.

Additionally, in accordance with another aspect of an embodiment of the present invention a doubly-Toeplitz mask 108 is an example of an optical system in which the operation of the optics create an image that can be modeled separately in the two axes of an imager, so that the two-dimensional OTF (optical transfer function) can be treated as a sequential (x-axis then y-axis, or y-axis then x-axis) application of two one-dimensional OTFs. Separable optics have the advantage of having blur functions that can be processed very quickly to improve the quality of the images. The mathematical methods outlined herein are applicable to any system having separable OTFs, and would improve the quality of images recovered from such systems.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the invention are an example and the invention is not limited to the exact details shown or described.

What is claimed:

1. A coded image system recovering an object scene from an encoded image, the image system comprising:
   (a) an encoding logic creating an encoded image, the encoding logic including a doubly-Toeplitz matrix produced by two one-dimensional vectors, and an electronic device operatively coupled with the matrix adapted to be spaced a distance away from a physical object scene; and
   (b) a decoding logic operatively coupled to the encoding logic to decode the encoded image recovering a visual representation of the object scene from the encoded image;
   wherein the encoding logic permits that partial encoding may be inversed;
   wherein the decoding logic comprises:
   a reconstruction logic operatively coupled to the encoding logic to digitally reconstruct the object scene having a byte-size larger than the encoded image,
   wherein the reconstruction logic comprises:
   an imager including a dynamic range to unfold edges of the encoded image from a center without significant loss of information.

2. The coded image system of claim 1, wherein the doubly-Toeplitz matrix is realized in a medium selected from a group comprising a programmable aperture mask, a non-programmable aperture mask, a liquid crystal spatial light modulator, an eyelid array and a self-supporting printed member.

3. The coded image system of claim 1, wherein the decoding logic comprises:
   a computational time period to decode the encoded image, wherein the time period is less than one second for images that are one hundred megapixel in size when a 10 Gigaflops processor is employed.

4. The coded image system of claim 3, wherein the time period is less than ten milliseconds for images that are one megapixel in size when a 10 Gigaflops processor is employed.

5. The coded image system of claim 1, wherein the decoding logic comprises:
   a filtering logic operatively coupled to the encoding logic to remove pixel-to-pixel response variations caused by one or more of the following: dark noise, fixed-pattern noise, and bad pixels.

6. The coded image system of claim 5, wherein the filtering logic comprises:
   averaging logic to average multiple frames of imagery to mitigate random noise obtained by the encoding logic.

7. The coded image system of claim 1, wherein the decoding logic comprises:
   a regularization logic operatively coupled to the encoding logic to regularize the doubly-Toeplitz encoded image.

8. The coded image system of claim 7, wherein the doubly-Toeplitz matrix is on a programmable aperture mask, and wherein the regularization logic comprises a Tikhonov regularization method.

9. The coded image system of claim 1, wherein the decoding logic comprises:
a regularization logic operatively coupled to the programmable encoding logic obtains a normal equation that reduces noise effects including at least one photon counting and read noise;
wherein the two one-dimensional vectors are non-square defining an ill-posed matrix; and
wherein the regularization logic corrects the ill-posed matrix so that it may be inversed.

10. The coded image system of claim 9, wherein the regularization logic includes a normal algorithm to correct the ill posed matrix so that it may be inversed.

11. The coded image system of claim 1, wherein the reconstruction logic further comprises:
a spatial frequency spectra of the doubly-Toeplitz matrix free of any zeros.

12. The coded image system of claim 1, wherein the reconstruction logic further comprises:
an optimization logic to estimate parameters to obtain a scene reconstruction, the optimization logic including at least one Tikhonov regularization constant to reduce noise during the reconstruction of the object scene.

13. The coded image system of claim 1, further comprising:
a monitor to display the visual representation of the recovered object scene and wherein the physical object scene is non-uniform.

14. The coded image system of claim 1, further comprising:
a pattern within one mask length unit from an edge of the reconstructed image; and
wherein the decoding logic includes a normalizing logic to normalize the pattern out of the reconstructed image by removing brightness differences accrued near the edge of the reconstructed image.

15. The coded image system of claim 14, wherein the normalizing logic further comprises:
a estimated object ($O_{Est}$);
a white estimate ($W_{Est}$);
a normalized object estimate ($O_{Norm}$) and
wherein dividing the estimated object ($O_{Est}$) by the white estimate ($W_{Est}$) element-by-element to obtains the normalized object estimate ($O_{Norm}$).

16. The coded image system of claim 1, wherein the decoding logic comprises:
an iteration logic operatively coupled to the encoding logic to reduce numerical round-off errors in inversions of a matrix programmed in the aperture mask.

17. The coded image system of claim 16, wherein the iteration logic includes an iteration stopping logic comprising one of the following: a priori criteria and a posteriori criteria.

18. The coded image system of claim 1, further comprising:
one of an imager and a camera operatively coupled to programmable aperture mask of the encoding logic to capture visual input of the physical object scene therethrough.

19. The coded image system of claim 1, wherein the doubly-Toeplitz matrix permits radiation through openings defined by the matrix and blocks radiation through non-openings defined by the matrix, wherein the radiation is selected from the group comprising visible light, x-rays, gamma rays, UV light, and infrared light.

20. A method comprising the steps of:
encoding an image through a doubly-Toeplitz matrix coupled to a camera to create an encoded image, wherein the encoding permits that partial encoding may be inversed;
decoding the encoded image to recover a visual representation of an object scene, wherein the decoding digitally reconstructs the object scene,
wherein the reconstructing comprises,
imaging using an imager including a dynamic range to unfold edges of the encoded image from a center without significant loss of information; and
displaying the recovered object scene in a monitor, wherein the recovered object scene is larger than the encoded image.

21. The method of claim 20, wherein the step of decoding is accomplished via Tikhonov regularization within a computational time period to decode less than one second for images that are one hundred megapixel in size.

22. The method of claim 20, wherein the step of decoding includes the step of:
filtering the doubly-Toeplitz encoded image to remove pixel-to-pixel response variations caused by one or more of the following: dark noise, fixed-pattern noise, and bad pixels;
regularizing the doubly-Toeplitz encoded image via a Tikhonov regularization method; and
reconstructing the object scene as a decoded image larger than the encoded image.

23. The method of claim 22, further comprising the steps of:
iterating the encoded image to reduce numerical round-off errors in inversions of the doubly-Toeplitz matrix in the aperture mask.

24. The method of claim 20, wherein the doubly-Toeplitz matrix is realized in a medium selected from a group comprising a programmable aperture mask, a non-programmable aperture mask, a liquid crystal spatial light modulator, an eyelid array and a self-supporting printed member.

* * * * *